US012255026B2

(12) United States Patent
Miyachi et al.

(10) Patent No.: US 12,255,026 B2
(45) Date of Patent: Mar. 18, 2025

(54) ELECTROLYTIC CAPACITOR

(71) Applicant: Panasonic Intellectual Property Management Co., Ltd., Osaka (JP)

(72) Inventors: Yuji Miyachi, Saga Ken (JP); Takayuki Matsumoto, Saga Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 145 days.

(21) Appl. No.: 17/914,234

(22) PCT Filed: Mar. 25, 2021

(86) PCT No.: PCT/JP2021/012711
§ 371 (c)(1),
(2) Date: Sep. 23, 2022

(87) PCT Pub. No.: WO2021/193866
PCT Pub. Date: Sep. 30, 2021

(65) Prior Publication Data
US 2023/0113070 A1    Apr. 13, 2023

(30) Foreign Application Priority Data

Mar. 27, 2020  (JP) ................................ 2020-058655
Mar. 27, 2020  (JP) ................................ 2020-058659

(51) Int. Cl.
*H01G 9/012*  (2006.01)
*H01G 9/052*  (2006.01)

(52) U.S. Cl.
CPC ............. *H01G 9/012* (2013.01); *H01G 9/052* (2013.01)

(58) Field of Classification Search
CPC ................................ H01G 9/052; H01G 9/012
See application file for complete search history.

(56) References Cited

U.S. PATENT DOCUMENTS 4,539,623 A * 9/1985 Irikura .................. H01G 9/012
                                                        29/25.03
11,201,016 B2 * 12/2021 Ogata ....................... H01G 9/15
(Continued)

FOREIGN PATENT DOCUMENTS

CN   110249400 A    9/2019
JP   S58-193628 U   12/1983
(Continued)

OTHER PUBLICATIONS

International Search Report Issued in International Patent Application No. PCT/JP2021/012711 dated Jun. 22, 2021; with English translation.
(Continued)

*Primary Examiner* — David M Sinclair
(74) *Attorney, Agent, or Firm* — Rimon P.C.

(57) ABSTRACT

A disclosed electrolytic capacitor includes a capacitor element and a cathode lead terminal. The capacitor element includes an anode body and a cathode part. The cathode lead terminal includes a connection part that is connected to the cathode part via a conductive member. The connection part includes a plate-shaped part, and first and second side walls standing from the plate-shaped part. Grooves are formed in a surface of each of the plate-shaped part and the first and second side walls. The grooves include first grooves and second grooves that are formed so as to extend continuously from the plate-shaped part across the first and second side walls. The conductive member is disposed between one surface of the cathode part and the plate-shaped part, and between two side surfaces of the cathode part and the respective corresponding first and second side surfaces.

8 Claims, 17 Drawing Sheets

(56) References Cited

U.S. PATENT DOCUMENTS

| | | | |
|---|---|---|---|
| 2003/0151884 A1 | 8/2003 | Matsumoto | |
| 2004/0113242 A1* | 6/2004 | Kato | H01L 24/01 |
| | | | 257/666 |
| 2009/0147448 A1 | 6/2009 | Matsuoka et al. | |
| 2013/0222977 A1* | 8/2013 | Kawahito | H01G 9/08 |
| | | | 361/523 |
| 2019/0355526 A1 | 11/2019 | Yokokura et al. | |

FOREIGN PATENT DOCUMENTS

| | | | |
|---|---|---|---|
| JP | 2003-068576 A | 3/2003 |
| JP | 2006-237195 A | 9/2006 |
| JP | 2007-214167 A | 8/2007 |
| JP | 2008-091389 A | 4/2008 |
| JP | 2008-277331 A | 11/2008 |
| JP | 2009-141208 A | 6/2009 |

OTHER PUBLICATIONS

Chinese Office Action dated Jul. 23, 2024 issued in the corresponding Chinese Patent Application No. 202180021978.4, with partial English translation.

* cited by examiner

ELECTROLYTIC CAPACITOR

CROSS-REFERENCE OF RELATED APPLICATIONS

This application is the U.S. National Phase under 35 U.S.C. § 371 of International Patent Application No. PCT/JP2021/012711, filed on Mar. 25, 2021, which in turn claims the benefit of Japanese Patent Application No. 2020-058655, filed on Mar. 27, 2020, and Japanese Patent Application No. 2020-058659, filed on Mar. 27, 2020, the entire disclosures of which Applications are incorporated by reference herein.

TECHNICAL FIELD

The present disclosure relates to an electrolytic capacitor.

BACKGROUND ART

Electrolytic capacitors are mounted in various electronic devices. Usually, an electrolytic capacitor includes a capacitor element including an anode part and a cathode part, an anode lead terminal, a cathode lead terminal, and an exterior resin that covers the capacitor element. The anode lead terminal is electrically connected to the anode part, and the cathode lead terminal is electrically connected to the cathode part.

Cathode lead terminals having various shapes have hitherto been proposed (e.g., PTLs 1 to 3). PTL 1 discloses "An electrolytic capacitor . . . , wherein a recessed part including a plurality of grooves or recesses is provided on a surface of the cathode lead frame that is in contact with the conductive adhesive, and a surface of the cathode lead frame that is in contact with the exterior resin."

FIG. 7 of PTL 2 discloses that a fitting part is formed by upwardly bending opposite sides of a cathode lead terminal.

CITATION LIST

Patent Literatures

PTL 1: Japanese Laid-Open Patent Publication No. 2006-237195
PTL 2: Japanese Laid-Open Patent Publication No. 2003-068576
PTL 3: Japanese Laid-Open Patent Publication No. 2009-141208

SUMMARY OF INVENTION

Technical Problem

Electrolytic capacitors are required to have a reduced ESR, for example. Under such a circumstance, it is an object of the present disclosure to provide an electrolytic capacitor with a low ESR.

Solution to Problem

An aspect of the present disclosure relates to an electrolytic capacitor. The electrolytic capacitor includes: a capacitor element; an anode lead terminal and a cathode lead terminal that are electrically connected to the capacitor element; a conductive member; and an exterior resin disposed around the capacitor element, wherein the capacitor element includes an anode body that is a porous sintered body having a dielectric layer formed on a surface thereof, an anode wire projecting from an end face of the anode body, and a cathode part disposed adjacent to the dielectric layer, the cathode part has first and second side surfaces, and a bottom surface and a top surface that join the first and second side surfaces, the cathode lead terminal includes a connection part that is connected to the cathode part via the conductive member, the connection part includes a plate-shaped part facing one surface selected from the bottom surface and the top surface with the conductive member interposed between the plate-shaped part and the one surface, and first and second side walls standing from the plate-shaped part and respectively facing the first and second side surfaces, a plurality of grooves are formed in a surface, located on the cathode part side, of each of the plate-shaped part and the first and second side walls, the plurality of grooves include a plurality of first grooves formed so as to extend continuously from the plate-shaped part across the first side wall, and a plurality of second grooves formed so as to extend continuously from the plate-shaped part across the second side wall, and the conductive member is disposed between the one surface and the plate-shaped part, between the first side surface and the first side wall, and between the second side surface and the second side wall.

Another aspect of the present disclosure relates to another electrolytic capacitor. The other electrolytic capacitor includes: a capacitor element; an anode lead terminal and a cathode lead terminal that are electrically connected to the capacitor element; a conductive member; and an exterior resin disposed around the capacitor element, wherein the capacitor element includes an anode body that is a porous sintered body having a dielectric layer formed on a surface thereof, an anode wire projecting from an end face of the anode body, and a cathode part disposed so as to surround the anode body, the cathode part has two side surfaces, and a bottom surface and a top surface that join the two side surfaces, the cathode lead terminal includes a connection part that is connected to the cathode part via the conductive member, the connection part includes a plate-shaped part facing one surface selected from the bottom surface and the top surface with the conductive member interposed between the plate-shaped part and the one surface, and two side walls standing from the plate-shaped part and respectively facing the two side surfaces, the conductive member is disposed between the one surface and the plate-shaped part, and between the two side surfaces and the two side walls respectively facing the two side surfaces, and a volume between the cathode part and the two side walls increases in a direction away from the end face.

Yet another aspect of the present disclosure relates to yet another electrolytic capacitor. The yet another electrolytic capacitor includes: a capacitor element; an anode lead terminal and a cathode lead terminal that are electrically connected to the capacitor element; a conductive member; and an exterior resin disposed around the capacitor element, wherein the capacitor element includes an anode body that is a porous sintered body having a dielectric layer formed on a surface thereof, an anode wire projecting from an end face of the anode body, and a cathode part disposed so as to surround the anode body, the cathode part has two side surfaces, and a bottom surface and a top surface that join the two side surfaces, the cathode lead terminal includes a connection part that is connected to the cathode part via the conductive member, the connection part includes a plate-shaped part facing one surface selected from the bottom surface and the top surface with the conductive member interposed between the plate-shaped part and the one surface, and two side walls standing from the plate-shaped part and respectively facing the two side surfaces, the conductive member is disposed between the one surface and the plate-shaped part, and between the two side surfaces and the two side walls respectively facing the two side surfaces, and an end portion of each of the two side walls located on the end face side is more distant from the end face than an end portion of the plate-shaped part located on the end face side is from the end face.

Advantageous Effects of Invention

According to the present disclosure, it is possible to obtain an electrolytic capacitor with a low ESR.

While the novel features of the invention are set forth in the appended claims, the invention, both as to organization and content, will be better understood and appreciated, along with other objects and features thereof, from the following detailed description taken in conjunction with the drawings.

DESCRIPTION OF EMBODIMENTS

Figure 1:
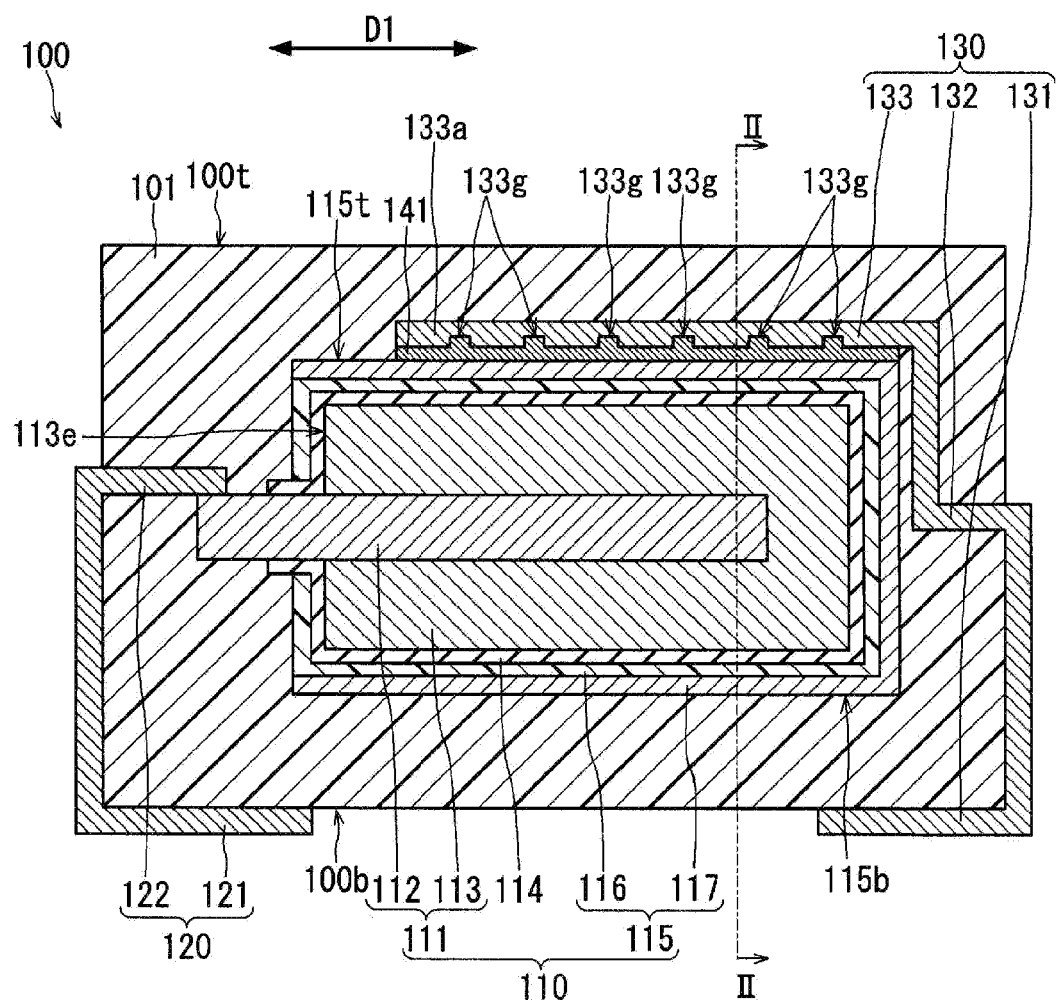
FIG. 1 is a cross-sectional view schematically showing an example of a first electrolytic capacitor according to the present disclosure.

Embodiments of first to third electrolytic capacitors according to the present disclosure will be described below by way of examples. However, the electrolytic capacitors according to the present disclosure are not limited to the examples described below. Although examples of specific numerical values and materials may be given in the following description, other numerical values and materials may be used as long as the effects of the present disclosure can be achieved. Note that constituent elements of known electrolytic capacitors may be used as constituent elements other than those characteristic of the present disclosure. As used herein, in the expression "the range of a numerical value A to a numerical value B", this range includes the numerical value A and the numerical value B.

First Electrolytic Capacitor

The first electrolytic capacitor according to the present disclosure includes: a capacitor element; an anode lead terminal and a cathode lead terminal that are electrically connected to the capacitor element; a conductive member; and an exterior resin disposed around the capacitor element. The capacitor element includes an anode body that is a porous sintered body having a dielectric layer formed on a surface thereof, an anode wire projecting from an end face of the anode body, and a cathode part disposed adjacent to the dielectric layer. The cathode part has first and second side surfaces, and a bottom surface and a top surface that join the first and second side surfaces. The cathode lead terminal includes a connection part that is connected to the cathode part via the conductive member. The connection part includes a plate-shaped part facing one surface selected from the bottom surface and the top surface with the conductive member interposed between the plate-shaped part and the one surface, and first and second side walls standing from the plate-shaped part and respectively facing the first and second side surfaces. A plurality of grooves are formed in a surface, located on the cathode part side, of each of the plate-shaped part and the first and second side walls. The plurality of grooves include a plurality of first grooves formed so as to extend continuously from the plate-shaped part across the first side wall, and a plurality of second grooves formed so as to extend continuously from the plate-shaped part across the second side wall. The conductive member is disposed between the one surface and the plate-shaped part, between the first side surface and the first side wall, and between the second side surface and the second side wall. That is, the conductive member is in contact with and connects the one surface and the plate-shaped part, is in contact with and connects the first side surface and the first side wall, and is in contact with and connect the second side surface and the second side wall.

The anode lead terminal and the cathode lead terminal may each include an anode terminal part and a cathode terminal part that are exposed on a surface of the electrolytic capacitor. When the electrolytic capacitor is mounted, the anode terminal part and the cathode terminal part are joined to a substrate or the like using solder. In the present specification, a side on which the anode terminal part and the cathode terminal part are exposed may be expressed as a bottom side, and the opposite side of the bottom side may be expressed as a top side.

The anode body has a rectangular parallelepiped shape, for example, and has a bottom surface located on the side of the anode terminal part and the cathode terminal part, a top surface facing the bottom surface, an end face (E) from which the anode lead terminal projects, first and second side surfaces, and a surface facing the end face (E). The first and second side surfaces are connected with the end face (E), the bottom surface, and the top surface. The first and second side surfaces of the cathode part are outer surfaces of the cathode part that are formed on the first and second side surfaces of the anode body. The bottom surface of the cathode part is an outer surface of the cathode part that is formed on the bottom surface of the anode body. The top surface of the cathode part is an outer surface of the cathode part that is formed on the top surface of the anode body.

The cathode part is formed so as to surround the anode body with the dielectric layer interposed therebetween. The cathode part may be formed on five surfaces of the anode body except the end face (E) from which the anode lead projects, with the dielectric layer interposed between the cathode part and each of the five surfaces. In that case, the cathode part is formed in the shape of a rectangular tube closed at one end.

In order to reduce the ESR, it is necessary to increase the connection area between the cathode part and the cathode lead terminal. For the electrolytic capacitor of PTL 1, it is conceivable to apply the conductive adhesive to the entire surface of the cathode lead terminal facing the cathode part in order to increase the connection area between the cathode part and the cathode lead terminal. However, doing so may cause the applied conductive adhesive to protrude from the space between the cathode part and the cathode lead terminal, resulting in a defect in a covering formed by the exterior resin, or a problem such as a short circuit. In addition, with the electrolytic capacitor of PTL 1, it may be difficult to hold the capacitor element at a stable position when connecting the cathode part and the cathode lead terminal of the capacitor element.

On the other hand, the connection part of the first electrolytic capacitor includes the plate-shaped part and the first and second side walls. Accordingly, even if a large amount of a conductive material (a material that will constitute the conductive member, e.g., a metal paste) is disposed between the plate-shaped part and the cathode part in order to increase the connection area between the plate-shaped part and the cathode part, an excess conductive material moves to the space between each of the first and second side walls of the connection part and the cathode part, and is prevented from protruding from the connection part. With this configuration, the plate-shaped part and the first and second side walls of the connection part are connected to the cathode part by the conductive member. Accordingly, it is possible to increase the connection area between the plate-shaped part and the cathode part, thus reducing the ESR.

In particular, grooves extending continuously across the plate-shaped part and the first and second side walls are formed in the connection part of the first electrolytic capacitor. The grooves allow the conductive material disposed on the surface of the plate-shaped part and/or the surface of the cathode part to easily move to the space between each of the first and second side walls and the plate-shaped part. Accordingly, with the first electrolytic capacitor, it is particularly easy to increase the connection area between the plate-shaped part and the cathode part. Furthermore, forming the grooves in the connection part makes it possible to increase the anchor effect, thus increasing the adhesion between the connection part and the cathode part. That is, with this configuration, it is possible to obtain a highly reliable electrolytic capacitor.

Furthermore, with the first electrolytic capacitor, the movement of the capacitor element is limited by the first and second side walls of the cathode lead terminal when connecting the capacitor element and the cathode lead terminal. This facilitates the positioning of the capacitor element, thus making it possible to prevent the capacitor element from being displaced and connected to the cathode lead terminal. Therefore, according to the present disclosure, it is possible to obtain a highly reliable electrolytic capacitor that can be easily manufactured.

There is no particular limitation on the width, the depth, the number, and the area of grooves formed in the connection part of the cathode lead terminal. There is also no particular limitation on the number of grooves formed.

A direction in which the anode wire extends may be hereinafter referred to as a "direction D1." An end portion (end portion located on the end face (E) side) of the connection part may be present on the end face (E) side relative to the center (center in the direction D1) of the anode body. With this configuration, it is possible to increase the area of the connection part that is connected to the cathode part by the conductive member.

Each of the plate-shaped part, the first side wall, and the second side wall of the connection part may have a rectangular shape, or may have a shape other than a rectangular shape.

The conductive member may be disposed in the first grooves so as to extend continuously from the plate-shaped part across the first side wall, and the conductive member may be disposed in the second grooves so as to extend continuously from the plate-shaped part across the second side wall. With this configuration, it is possible to achieve a particularly high anchor effect.

Each of the plurality of first grooves may extend continuously with the corresponding one of the plurality of second grooves to form a single groove. That is, the plurality of grooves may extend continuously from the plate-shaped part across the first and second side walls.

Each of the plurality of grooves may extend in a direction substantially perpendicular to the direction in which the anode wire extends. This configuration allows the conductive material disposed on a surface of the plate-shaped part and/or a surface of the cathode part facing the plate-shaped part to easily move to the space between each of the first and second side walls and the plate-shaped part. Here, the "direction substantially perpendicular" means a direction whose angle of inclination to a perpendicular direction is less than 10°.

As long as each of the grooves is formed so as to extend continuously from the connection part across the side wall parts, the plurality of grooves may be disposed in an arrangement other than the above-described arrangement.

For example, the plurality of grooves may intersect each other to form a grid pattern. In that case as well, each of the grooves extends continuously from the connection part across the side wall parts. Each of the plurality of grooves may be linear or curved, or have a shape formed by a combination of a plurality of straight lines and/or a plurality of curves.

Of the above-described plurality of grooves, grooves that are formed in the first and second side walls may each be formed so as to be away from the end face (E) in a direction away from the plate-shaped part. With this configuration, the material of the conductive member disposed between each of the side walls and the cathode part can be easily guided to a position away from the end face (E). As a result, prevention of a short circuit between the anode part and the cathode part is facilitated.

Grooves may also be formed in a surface, located on an opposite side of the surface located on the cathode part side, of each of the plate-shaped part and the first and second side walls of the connection part. Also, the exterior resin may be disposed in the grooves of the surface located on the opposite side. With this configuration, the adhesive strength between the exterior resin and the connection part can be increased by an anchor effect.

The first and second side walls of the connection part may be substantially parallel to the first and second side surfaces of the anode body. That is, the first and second side walls of the connection part may stand substantially perpendicularly from the plate-shaped part. For example, the angle formed by the plate-shaped part and the first side wall, and the angle formed by the plate-shaped part and the second side wall may be greater than or equal to 90° and less than 100°. Alternatively, the first and second side walls of the connection part may be formed so as to be away from each other in a direction away from the plate-shaped part. For example, the angle formed by the plate-shaped part and the first side wall, and the angle formed by the plate-shaped part and the second side wall may be greater than or equal to 100° and less than or equal to 120°. With this configuration, it is possible to prevent the conductive material from protruding from the second side wall even if the amount of the conductive material serving as the material of the conductive member is large.

Second Electrolytic Capacitor

The second electrolytic capacitor includes: a capacitor element; an anode lead terminal and a cathode lead terminal that are electrically connected to the capacitor element; a conductive member; and an exterior resin disposed around the capacitor element. The capacitor element includes an anode body that is a porous sintered body having a dielectric layer formed on a surface thereof, an anode wire projecting from an end face of the anode body, and a cathode part disposed so as to surround the anode body. The cathode part has two side surfaces, and a bottom surface and a top surface that join the two side surfaces. The cathode lead terminal includes a connection part that is connected to the cathode part via the conductive member. The connection part includes a plate-shaped part facing one surface selected from the bottom surface and the top surface of the cathode part with the conductive member interposed between the plate-shaped part and the one surface, and two side walls standing from the plate-shaped part and respectively facing the two side surfaces of the cathode part. The conductive member is disposed between the one surface and the plate-shaped part of the connection part, and between the two side surfaces of the cathode part and the two side walls of the connection part that respectively face the two side surfaces. A volume between the cathode part and the two side walls increases in a direction away from the end face of the anode body. In the following, an end face of the anode body from which the anode wire projects may be referred to as an "end face (E)".

Note that, in the second and third capacitors, the two side surfaces of the cathode part can be read as the first side surface and the second side surface, and the two side walls of the connection part can be read as the first and second side walls. The first side surface and the second side surface of the cathode part respectively face the first side wall and the second side wall of the connection part.

The cathode part and the cathode lead terminal are connected by the conductive member. The conductive member can be formed, for example, by applying, to the cathode part and/or the plate-shaped part of the cathode lead terminal, a conductive material serving as the material of a conductive member, and thereafter changing the conductive material into a conductive member through heating or the like.

In order to reduce the ESR, it is necessary to increase the connection area between the cathode part and the connection part of the cathode lead terminal. For this purpose, it is necessary to increase the area of the conductive member, and it is conceivable to apply the conductive material over a wide range of the surface of the connection part. However, the application of a large amount of the conductive material to increase the area of the conductive member will increase the possibility that an excess conductive material protrudes from the plate-shaped part, thus causing a problem such as a short circuit between the anode wire and the cathode part.

In the second electrolytic capacitor, the connection part of the cathode lead terminal includes the side walls. Accordingly, each of the side walls and the cathode part can also be connected by the conductive member. As a result, it is possible to achieve a low ESR. In the second electrolytic capacitor, the volume between the cathode part and the two side walls increases in a direction away from the end face (E) of the anode body. Accordingly, even if a large amount of a conductive material is applied, an excess conductive material is guided in a direction away from the end face (E) on which the anode wire is present. This makes it possible to prevent the protruding conductive material from reaching the end face (E), thus preventing a problem such as a short circuit between the anode part and the cathode part. That is, the second electrolytic capacitor can be manufactured with a high yield. In addition, this configuration enables application of a large amount of the conductive adhesive, and therefore can increase the area of the conductive member. As a result, it is possible to reduce the ESR.

In at least a portion thereof connected with the above-described two side walls, the plate-shaped part of the connection part of the cathode lead terminal may have a width that increases in a direction away from the end face (E). In this case, an angle $\alpha 1$ formed by a direction in which each of the side walls of the connection part extends and the corresponding side surface (more specifically, a plane including the side surface) of the cathode part may be in the range of 5 to 20°.

Alternatively, the plate-shaped part of the connection part of the cathode lead terminal may have a rectangular shape. Also, the distance between each of the two side walls of the connection part and the cathode part may increase as the distance from the end face (E) and the distance from the plate-shaped part increase. In this case, an angle $\alpha 2$ formed by a direction in which an upper side of each of the side walls of the connection part extends and the corresponding side surface (more specifically, a plane including the side surface) of the cathode part may be in the range of 5 to 20°. Here, the upper side means one of the sides of each of the side walls that is most distant from the plate-shaped part of the connection part.

A distance X1, in a direction D1 in which the anode wire 112 extends, between the end face (E) and an end portion of the plate-shaped part located on the end face (E) side, and a distance Y1, in the direction D1, between the end face (E) and an end portion of each of the two side walls located on the end face (E) side may each be in the range of 10 to 40% (e.g., the range of 20 to 30%) of a length L1 of the anode body in the direction D1. Note that the distance X1 and the distance Y1 may be different, but are typically the same.

Third Electrolytic Capacitor

The third electrolytic capacitor includes: a capacitor element; an anode lead terminal and a cathode lead terminal that are electrically connected to the capacitor element; a conductive member; and an exterior resin disposed around the capacitor element. The capacitor element includes an anode body that is a porous sintered body having a dielectric layer formed on a surface thereof, an anode wire projecting from an end face of the anode body, and a cathode part disposed so as to surround the anode body. The cathode part has two side surfaces, and a bottom surface and a top surface that join the two side surfaces. The cathode lead terminal includes a connection part that is connected to the cathode part via the conductive member. The connection part includes a plate-shaped part facing one surface selected from the bottom surface and the top surface with the conductive member interposed between the plate-shaped part and the one surface, and two side walls standing from the plate-shaped part and respectively facing the two side surfaces. The conductive member is disposed between the one surface and the plate-shaped part of the connection part, and between the two side surfaces of the cathode part and the two side walls respectively facing the two side surfaces of the connection part. An end portion of each of the two side walls located on the end face side is more distant from the end face than an end portion of the plate-shaped part located on the end face side is from the end face.

The third electrolytic capacitor differs from the second electrolytic capacitor only with regard to the shape of the connection part of the cathode lead terminal, and therefore redundant descriptions thereof have been omitted.

In the third electrolytic capacitor, the connection part of the cathode lead terminal includes the side walls. Accordingly, each of the side walls and the cathode part can also be connected by the conductive member. As a result, it is possible to achieve a low ESR. In the third electrolytic capacitor, an end portion of each of the two side walls of the connection part located on the end face (E) side is more distant from the end face (E) than an end portion of the plate-shaped part of the connection part located on the end face (E) is from the end face (E). Accordingly, even if a large amount of a conductive material (the material of the conductive member) is applied, and an excess conductive material protrudes, the conductive material is likely to protrude from the end portions of the side walls located on the end face (E) side. This makes it possible to prevent the conductive adhesive from reaching the end face (E) to cause a short circuit or the like. That is, the third electrolytic capacitor can be manufactured with a high yield. In addition, this configuration enables application of a large amount of the conductive adhesive, and therefore can increase the area of the conductive member. As a result, it is possible to reduce the ESR.

The third electrolytic capacitor may satisfy the following configuration (1).

(1) A distance X2, in a direction D2 in which the anode wire extends, between the end face (E) and an end portion of the plate-shaped part of the connection part of the cathode lead terminal located on the end face (E) side is in a range of 10 to 50% (e.g., a range of 30 to 45%) of a length L2 of the anode body in the direction D2.

The third electrolytic capacitor may satisfy the above configuration (1), and the following configuration (2).

(2) A difference (Y2–X2) between the distance X2 and a distance Y2, in the direction D2, between the end face (E) and an end portion of each of the two side walls of the connection part located on the end face (E) side is in a range of 10 to 50% (e.g., a range of 30 45%) of the length L2.

An electrolytic capacitor according to the present disclosure may satisfy at least one condition selected from the group consisting of the following conditions (J1), (J2), and (J3). For example, the first electrolytic capacitor may satisfy the condition (J2) and/or (J3). The second capacitor may satisfy the condition (J3). In the following (J1) to (J3), "one surface" is one of the bottom surface and the top surface of the cathode part that the plate-shaped part faces with the conductive member interposed between the plate-shaped part and the one surface.

(J1) A plurality of grooves are formed in a surface, located on the cathode part side, of each of the plate-shaped part and the first and second side walls. The plurality of grooves include a plurality of first grooves formed so as to extend continuously from the plate-shaped part across the first side wall, and a plurality of second grooves formed so as to extend continuously from the plate-shaped part across the second side wall. The conductive member is disposed between the one surface and the plate-shaped part, between the first side surface and the first side wall, and between the second side surface and the second side wall.

(J2) The conductive member is disposed between the one surface and the plate-shaped part, and between the two side surfaces (first and second side surfaces) and the two side walls (first and second side walls) respectively facing the two side surfaces. A volume between the cathode part and the two side walls increases in a direction away from the end face.

(J3) The conductive member is disposed between the one surface and the plate-shaped part, and between the two side surfaces (first and second side surfaces) and the two side walls (first and second side walls) respectively facing the two side surfaces. An end portion of each of the two side walls located on the end face side is more distant from the end face than an end portion of the plate-shaped part located on the end face side is from the end face.

Examples of constituent elements common to the first to third electrolytic capacitors according to the present disclosure will be described below.

Cathode Lead Terminal

The cathode lead terminal has the above-described features. A typical cathode lead terminal includes a cathode terminal part exposed on a bottom surface of an electrolytic capacitor, and a connection part connected with the cathode terminal part. As described above, the connection part is connected to the cathode part via the conductive member.

Any material that can be used as the material of a cathode lead terminal of an electrolytic capacitor may be used as the material of the cathode lead terminal. For example, a known material of cathode lead terminals used for electrolytic capacitors may be used. The cathode lead terminal may be formed by working a metal sheet (including a metal plate and a metal foil) made of a metal (copper, a copper alloy, etc.) by a known metalworking method.

Anode Lead Terminal

A typical anode lead terminal includes an anode terminal part exposed on a bottom surface of an electrolytic capacitor, and a wire connection part connected with the anode terminal part. The wire connection part is connected to the anode wire. Any material that can be used as the material of an anode lead terminal of an electrolytic capacitor may be used as the material of the anode lead terminal. For example, a known material of anode lead terminals used for electrolytic capacitors may be used. The anode lead terminal may be formed by working a metal sheet (including a metal plate and a metal foil) made of a metal (copper, a copper alloy, etc.) by a known metalworking method.

Capacitor Element

The capacitor element includes an anode part and a cathode part. There is no particular limitation on the capacitor element, and a capacitor element used for a known electrolytic capacitor or a capacitor element having a configuration similar thereto may be used.

The anode part includes an anode body and an anode wire. The anode body is a porous sintered body having a dielectric layer formed on a surface thereof. The cathode part includes an electrolyte layer and a cathode layer. The electrolyte layer is disposed between the cathode layer and the dielectric layer formed on the surface of the anode body. There is no particular limitation on these constituent elements, and constituent elements used for known electrolytic capacitors may be used. Examples of these constituent elements will be described below.

Anode Body

The anode body is formed by sintering particles serving as the material. Examples of the particles include particles of a valve metal, particles of an alloy containing a valve metal, and particles of a compound containing a valve metal. One kind of these particles may be used alone, or two or more kinds of particles may be used as a mixture. As the valve metal, titanium (Ti), tantalum (Ta), niobium (Nb), or the like can be used.

The anode body may be produced by the following method. First, a portion of the anode wire is embedded in a powder (e.g., a metal powder) serving as the material of the anode body, and the powder is pressure-molded into a columnar shape (e.g., a rectangular parallelepiped shape). Thereafter, the powder is sintered to form an anode. Thus, an anode body with a portion of the anode wire embedded therein can be produced.

The dielectric layer formed on the surface of the anode body is not particularly limited, and may be formed by a known method. For example, the dielectric layer may be formed by immersing the anode body in a chemical formation solution to anodize the surface of the anode body. Alternatively, the dielectric layer may be formed by heating the anode body under an atmosphere containing oxygen to oxidize the surface of the anode body.

Anode Wire

The anode wire may be a wire made of a metal. Examples of the material of the anode wire include the above-described valve metal, copper, aluminum, and an aluminum alloy. A portion of the anode wire is embedded in the anode body, and the remaining portion projects from the end face (E) of the anode body. The anode wire has a bar shape. A distal end of the anode wire that projects from the anode body may have a cross-sectional shape different from that of the other portions.

Electrolyte Layer

There is no particular limitation on the electrolyte layer, and an electrolyte layer used for known electrolytic capacitors (e.g., a solid electrolytic capacitor) may be used. In the present specification, the electrolyte layer may be read as a solid electrolyte layer, and the electrolytic capacitor may be read as a solid electrolytic capacitor. The electrolyte layer may be a stack of two or more different electrolyte layers.

The electrolyte layer is disposed so as to cover at least a portion of the dielectric layer. The electrolyte layer may be formed using a manganese compound or a conductive polymer. Examples of the conductive polymer include polypyrrole, polythiophene, polyaniline, and derivatives thereof. These may be used alone or in a combination of two or more. The conductive polymer may be a copolymer of two or more monomers. Note that a derivative of a conductive polymer means a polymer including a conductive polymer as a basis skeleton thereof. Examples of the derivatives of polythiophene include poly(3,4-ethylenedioxythiophene).

Preferably, a dopant is added to the conductive polymer. The dopant can be selected according to the conductive polymer, and a known dopant may be used. Examples of the dopant include naphthalene sulfonic acid, p-toluene sulfonic acid, polystyrene sulfonic acid, and salts thereof. An exemplary electrolyte layer can be formed using poly(3,4-ethylenedioxythiophene) (PEDOT) doped with polystyrene sulfonic acid (PSS).

The electrolyte layer including a conductive polymer may be formed by polymerizing the raw material monomer on the dielectric layer. Alternatively, the electrolyte layer including a conductive polymer may be formed by applying, to the dielectric layer, a liquid containing a conductive polymer (and a dopant if necessary), followed by drying.

Cathode Layer

The cathode layer may be a conductive layer formed on the electrolyte layer, and, for example, may be a conductive layer formed so as to cover the electrolyte layer. The cathode layer may include a carbon layer formed on the electrolyte layer, and a metal paste layer formed on the carbon layer. The carbon layer may be formed of a conductive carbon material such as graphite and a resin. The metal paste layer may be formed of metal particles (e.g., silver particles) and a resin, or may be formed of a known silver paste, for example.

Conductive Member

The cathode layer is connected to the connection part of the cathode lead terminal by the conductive member. That is, the cathode layer (cathode part) is electrically connected to the cathode lead terminal. The conductive member is composed of a conductive material. The conductive member may be formed using a material containing metal particles (e.g., silver particles) and a resin, or may be formed using a known metal paste (e.g., a silver paste), for example. The conductive member may be formed by curing (e.g., curing through heating) a metal paste. Note that the conductive member may be composed of a plurality of conductive layers of different kinds.

Exterior Resin

The exterior resin is disposed around the capacitor element such that the capacitor element is not exposed on the surface of the electrolytic capacitor. Furthermore, the exterior resin insulates the anode lead terminal and the cathode lead terminal from each other. A known exterior resin used for electrolytic capacitors may be used as the exterior resin. For example, the exterior resin may be formed using an insulating resin material used for sealing capacitor elements. Examples of the exterior resin include epoxy resins, phenol resins, silicone resins, melamine resins, urea resins, alkyd resins, polyurethanes, polyimides, and unsaturated polyesters. The exterior resin may contain a substance (an inorganic filler, etc.) other than a resin.

Method for Manufacturing Electrolytic Capacitor

There is no particular limitation on the method for manufacturing the first to third electrolytic capacitors according to the present disclosure, and the first to third electrolytic capacitors may be manufactured, for example, by a manufacturing method described below. An example of the method for manufacturing the first to third electrolytic capacitors according to the present disclosure includes an application step of applying a conductive material (a material that will constitute a conductive member) to the plate-shaped part of the connection part of the cathode lead terminal and/or the cathode part, a bonding step of bonding the connection part and the cathode part via the conductive material, and a step of transforming the conductive material into a conductive member. The conductive material can be transformed into a conductive member through heating, curing, or the like. When bonding the connection part and the cathode part via the conductive material, the conductive material spreads in the space between each of the side surfaces of the cathode part and the corresponding side wall of the connection part. In the case where grooves are formed in the plate-shaped part and the side walls of the connection part, the conductive material is disposed in the grooves so as to extend continuously from the plate-shaped part across the side walls. In the application step, the conductive material may be applied to the plate-shaped part and the side wall parts.

In the following, exemplary electrolytic capacitors according to the present disclosure will be specifically described with reference to the drawings. The above-described constituent elements can be used as constituent elements of the exemplary electrolytic capacitors described below. The constituent elements of the exemplary electrolytic capacitors described below can be changed based on the above descriptions. The matters described below may be applied to the above-described embodiment. In the embodiments described below, constituent elements that are not essential to the electrolytic capacitors according to the present disclosure may be omitted.

Embodiment 1

Figure 2:
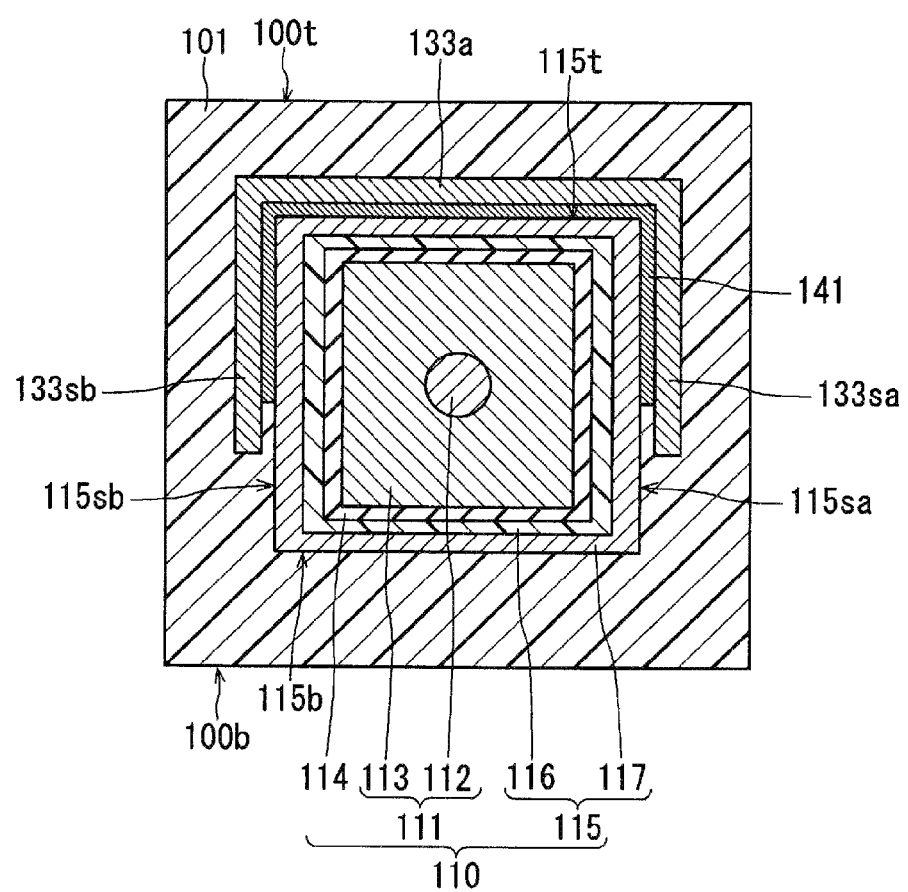
FIG. 2 is a view schematically showing a cross section taken along the line II-II in FIG. 1.
Figure 3A:
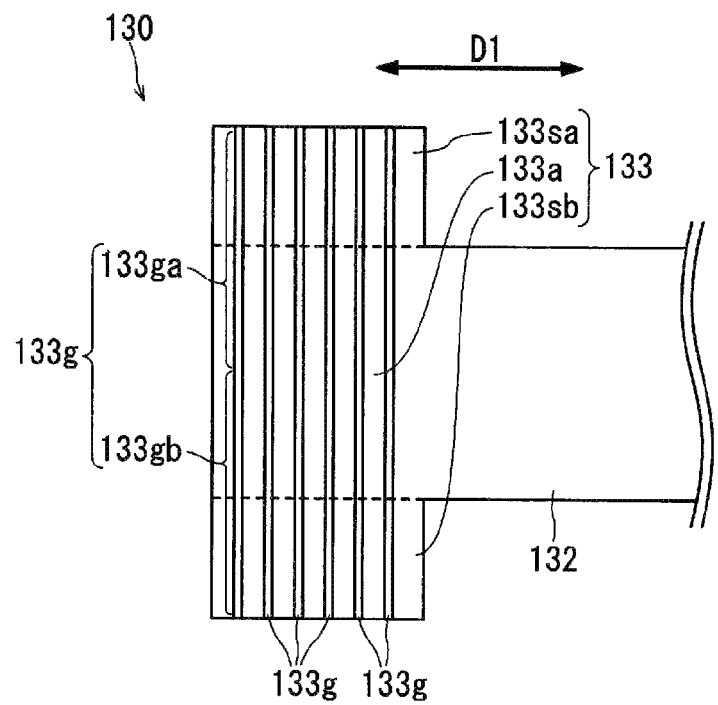
FIG. 3A is a development view schematically showing a portion of a cathode lead terminal of the electrolytic capacitor shown in FIG. 1.
Figure 3B:
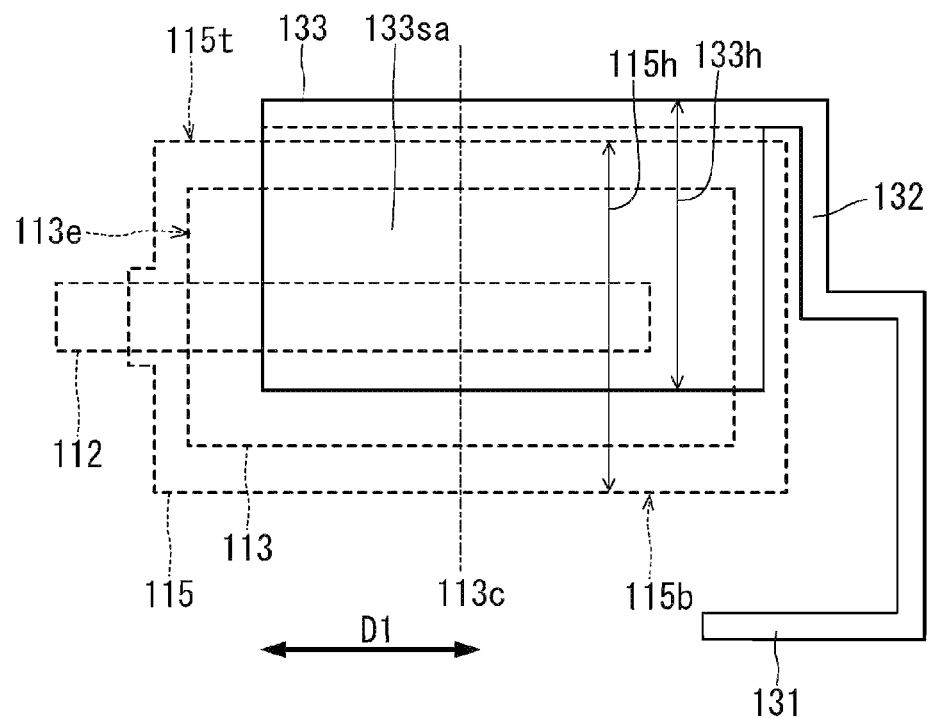
FIG. 3B is a side view schematically showing a portion of the cathode lead terminal of the electrolytic capacitor shown in FIG. 1.

In Embodiment 1, an example of the first electrolytic capacitor will be described. FIG. 1 schematically shows a cross-sectional view of an electrolytic capacitor 100 of Embodiment 1. Additionally, FIG. 2 shows a cross-sectional view taken along the line II-II in FIG. 1. FIG. 3A shows a development view of a cathode lead terminal 130 when a connection part 133 is developed flat. Note that FIG. 3A is a development view when the connection part 133 is viewed from the side on which grooves 133g are formed (the same also applies to the following development views). FIG. 3B shows a side view of the cathode lead terminal 130. Note that FIG. 3B also shows the positions of a cathode part 115 and so forth.

The electrolytic capacitor 100 includes a capacitor element 110, an anode lead terminal 120, a cathode lead terminal 130, an exterior resin 101, and a conductive member 141. The capacitor element 110 includes an anode part 111, a dielectric layer 114, and a cathode part 115. The anode part 111 includes an anode wire 112 and an anode body 113. The anode body 113 is a rectangular parallelepiped-shaped porous sintered body whose surface is covered by the dielectric layer 114. A portion of the anode wire 112 projects from an end face 113e of the anode body 113, and the other portions of the anode wire 112 are embedded in the anode body 113. Portions of the capacitor element 110 other than the anode wire 112 have a rectangular parallelepiped shape.

The cathode part 115 includes an electrolyte layer 116 disposed so as to cover the dielectric layer 114 (in another aspect, so as to cover the anode body 113), and a cathode layer 117 formed on the electrolyte layer 116. The cathode layer 117 includes, for example, a carbon layer formed on the electrolyte layer 116, and a metal particle layer formed on the carbon layer. The metal particle layer is a layer formed using a metal paste, for example.

The anode lead terminal 120 includes an anode terminal part 121 and a wire connection part 122. The anode terminal part 121 is exposed on a bottom surface 100b of the electrolytic capacitor 100. The wire connection part 122 is connected with the anode terminal part 121. The wire connection part 122 is connected to the anode wire 112. That is, the anode lead terminal 120 is electrically connected to the anode part 111 of the capacitor element 110. Note that the anode lead terminal 120 shown in FIG. 1 is merely an example, and the anode lead terminal 120 may have another shape as long as its function can be realized.

The cathode lead terminal 130 includes a cathode terminal part 131, a coupling part 132, and a connection part 133. The cathode terminal part 131 is exposed on the bottom surface 100b of the electrolytic capacitor 100. The coupling part 132 connects the cathode terminal part 131 and the connection part 133. The anode lead terminal 120 and the cathode lead terminal 130 each can be formed by working a single metal sheet by a known metalworking method.

In the following, a surface of the electrolytic capacitor 100 located on the opposite side of the bottom surface 100b may be referred to as a top surface 100t of the electrolytic capacitor 100. Note that the bottom surface 100b is the surface on which the anode terminal part 121 and the cathode terminal part 131 are exposed.

The cathode part 115 has first and second side surfaces 115sa and 115sb, and a bottom surface 115b and a top surface 115t that join the first side surface 115sa and the second side surface 115*sb*. The bottom surface 115*b* is a surface located on the bottom surface 100*b* side. The top surface 115*t* is a surface located on the top surface 100*t* side. The first and second side surfaces 115*sa* and 115*sb* are substantially perpendicular to the end face 113*e*.

The connection part 133 includes a plate-shaped part 133*a* facing the top surface 115*t* of the cathode part 115 with the conductive member 141 interposed therebetween, and first and second side walls 133*sa* and 133*sb* standing from the plate-shaped part 133*a*. The first and second side walls 133*sa* and 133*sb* face the first and second side surfaces 115*sa* and 115*sb*, respectively, of the cathode part 115 with the conductive member 141 intereposed therebetween. The first and second side walls 133*sa* and 133*sb* stand substantially perpendicularly from the plate-shaped part 133*a*.

The conductive member 141 is disposed between the top surface 115*t* and the plate-shaped part 133*a*, between the first side surface 115*sa* and the first side wall 133*sa*, and between the second side surface 115*sb* and the second side wall 133*sb*. That is, the conductive member 141 is in contact with and electrically connects the top surface 115*t* and the plate-shaped part 133*a*, is in contact with and electrically connects the first side surface 115*sa* and the first side wall 133*sa*, and is in contact with and electrically connects the second side surface 115*sb* and the second side wall 133*sb*.

Referring to FIG. 3A, a plurality of grooves 133*g* arranged in a striped pattern are formed on a surface of each of the plate-shaped part 133*a* and the side wall 133*sa* and 133*sb* that faces the cathode part 115. Each of the grooves 133*g* extends continuously from the plate-shaped part 133*a* across the first and second side walls 133*sa* and 133*sb*. Each of the grooves 133*g* extends in a direction perpendicular to the direction D1 in which the anode wire 112 extends.

Here, as shown in FIG. 3A, it can be considered that the plurality of grooves 133*g* include a plurality of first grooves 133*ga* and a plurality of second grooves 133*gb*. That is, it can be considered that each of the plurality of first grooves 133*ga* extends continuously with the corresponding one of the plurality of second grooves 133*gb* to form a single groove 133*g*. The same also applies to all of the grooves 133 that extend continuously from the plate-shaped part 133*a* with both the first and second side walls 133*sa* and 133*sb* g (e.g., grooves 133*g* shown in FIGS. 5 and 6). Each of the plurality of first grooves 133*ga* is formed so as to extend continuously from the plate-shaped part 133*a* across the first side wall 133*sa*. Each of the plurality of second grooves 133*gb* is formed so as to extend continuously from the plate-shaped part 133*a* across the second side wall 133*sb*.

FIG. 3B shows a height 133*h* of the first and second side walls of the connection part 133, and a height 115*h* of the side surface 115*sa* of the cathode part 115. The height 133*h* may be in the above-described range. FIG. 3B shows a center 113*c* (center in the direction D1) of the anode body 113. One end of the connection part 133 shown in FIG. 3B is present on the end face 113*e* side relative to the center 113*c*.

The conductive member 141 is disposed between, and electrically and physically connects the top surface 115*t* of the cathode part 115 and the plate-shaped part 133*a* of the connection part 133, and is disposed between, and electrically and physically connects the side surfaces 115*sa* and 115*sb* of the cathode part 115 and the side walls 133*sa* and 133*sb* of the connection part 133. The conductive member 141 is disposed in the plurality of grooves 133*g* so as to extend continuously from the grooves 133*g* of the plate-shaped part 133*a* across the grooves 133*g* of the first and second side walls 133*sa* and 133*sb*. These configurations can increase the contact area between the cathode part 115 and the conductive member 141, thus making it possible to reduce ESR. In addition, these configurations can suppress protrusion of the conductive member 141 from the connection part 133, thus making it possible to prevent a problem such as a short circuit. Furthermore, the cathode part 115 and the connection part 133 (cathode lead terminal 130) can be fixed with a high adhesion.

Figure 4:
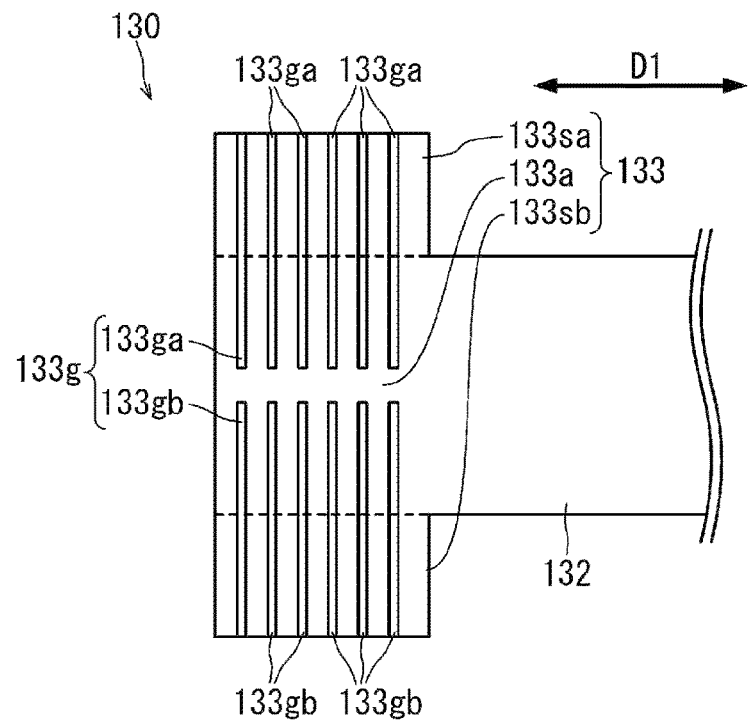
FIG. 4 is a development view schematically showing a portion of another example of the cathode lead terminal.
Figure 5:
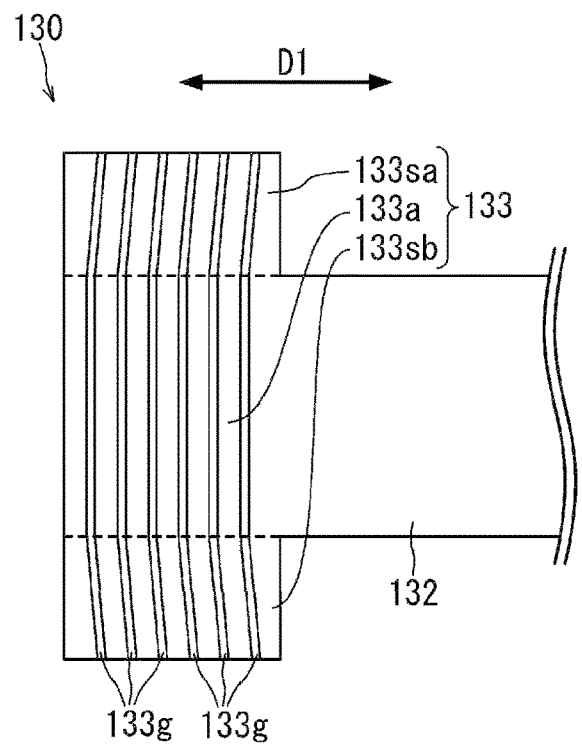
FIG. 5 is a development view schematically showing a portion of yet another example of the cathode lead terminal.
Figure 6:
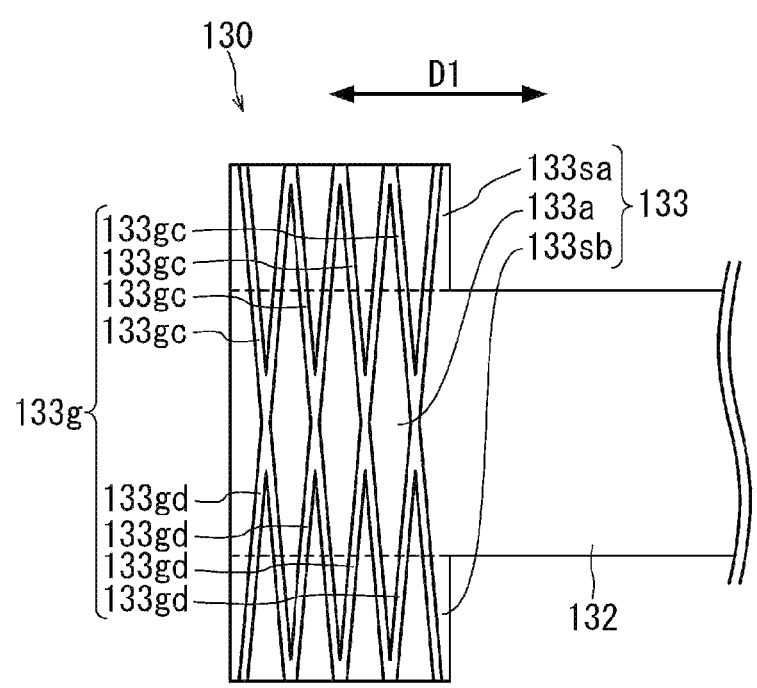
FIG. 6 is a development view schematically showing a portion of still another example of the cathode lead terminal.

In the example shown in FIGS. 1 to 3B, the cathode lead terminal 130 in which the linear grooves 133*g* are formed is described. However, the grooves 133*g* formed in the cathode lead terminal 130 may have another shape. FIGS. 4 to 6 each show a development view in which such a cathode lead terminal 130 is developed flat. With cathode lead terminals 130 shown in FIGS. 4 to 6, it is possible to achieve the above-described effects.

A plurality of grooves 133*g* are formed in a connection part 133 of the cathode lead terminal 130 shown in FIG. 4. The plurality of grooves 133*g* include a plurality of first grooves 133*ga* and a plurality of second grooves 133*gb*. The cathode lead terminal 130 shown in FIG. 4 differs from the cathode lead terminal 130 shown in FIG. 3 in that the first grooves 133*ga* and the second grooves 133*gb* do not extend continuously with each other. The rest of the configuration is the same as that of the cathode lead terminal 130 shown in FIG. 3, and therefore redundant descriptions thereof have been omitted. With the cathode lead terminal 130 shown in FIG. 4, when forming a conductive member 141, any material of the conductive member 141 that is disposed at portions where no groove 133*g* is present can be easily moved to the grooves 133*g* and the side walls 133*sa* and 133*sb* side.

A plurality of grooves 133*g* are formed in a connection part 133 of the cathode lead terminal 130 shown in FIG. 5. In the example shown in FIG. 4, the grooves 133*g* formed in the plate-shaped part 133*a* are linear groove extending substantially perpendicularly to the direction D1 in which the anode wire 112 extends. The grooves 133*g* formed in the side walls 133*sa* and 133*sb* are also linear grooves, but are formed so as to be away from the end face 113*e* of the anode body 113 in a direction away from the plate-shaped part 133*a*. All of the grooves 133*g* extend continuously from the plate-shaped part 133*a* across the side walls 133*sa* and 133*sb*.

With the configuration shown in FIG. 5, the material of the conductive member 141 disposed between the side surfaces 115*sa* and 115*sb* and the side walls 133*sa* and 133*sb* of the cathode part 115 can be easily guided in a direction away from the end face 113*e*. This can suppress protrusion of the material of the conductive member toward the anode wire 112 projecting from the end face 113*e*, thus making it possible to prevent a short circuit and the like.

A plurality of grooves 133*g* are formed in a connection part 133 of the cathode lead terminal 130 shown in FIG. 6. The plurality of grooves 133*g* includes a plurality of grooves 133*gc* arranged in a striped pattern, and a plurality of grooves 133*gd* arranged in a striped pattern. The plurality of grooves 133*gc* and the plurality of grooves 133*gd* are each inclined to a direction perpendicular to the direction D1 in which the anode wire 112 extends.

The plurality of grooves 133*gc* and the plurality of grooves 133*gd* are disposed so as to intersect each other. Each of the plurality of grooves 133*gc* and 133*gd* extends continuously from the plate-shaped part 133*a* across the first and second side walls 133*sa* and 133*sb*. However, some of the grooves 133*gc* and some of the grooves 133*gd* may extend continuously from the plate-shaped part 133a with only one of the first and second side walls 133sa and 133sb.

Figure 7:
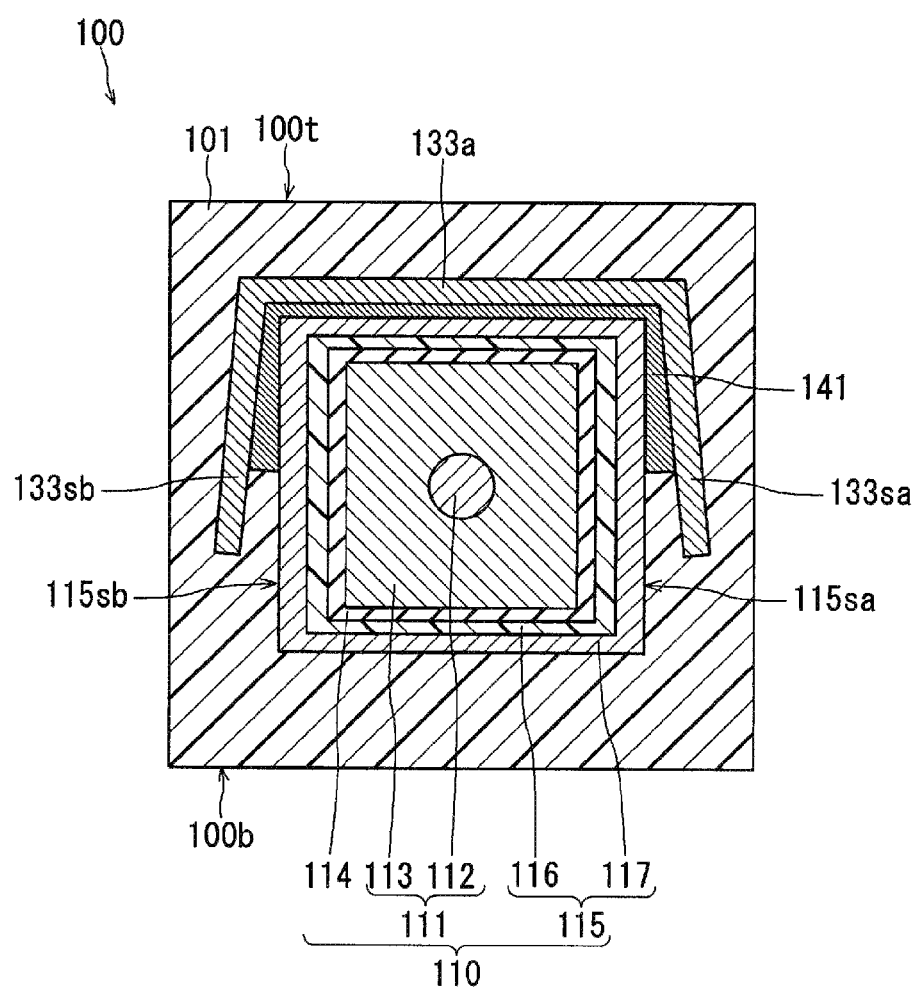
FIG. 7 is a cross-sectional view schematically showing another example of the first electrolytic capacitor according to the present disclosure.

FIG. 2 shows an example in which the first and second side walls 133sa and 133sb are substantially perpendicular to the plate-shaped part 133a. However, the first and second side walls 133sa and 133sb may spread out in a direction away from the plate-shaped part 133a. FIG. 7 shows a cross-sectional view of an example of an electrolytic capacitor 100 including such a connection part 133. In the connection part 133 shown in FIG. 7, the angle formed by each of the first and second side walls 133sa and 133sb and the plate-shaped part 133a may be greater than or equal to 100°.

Figure 8:
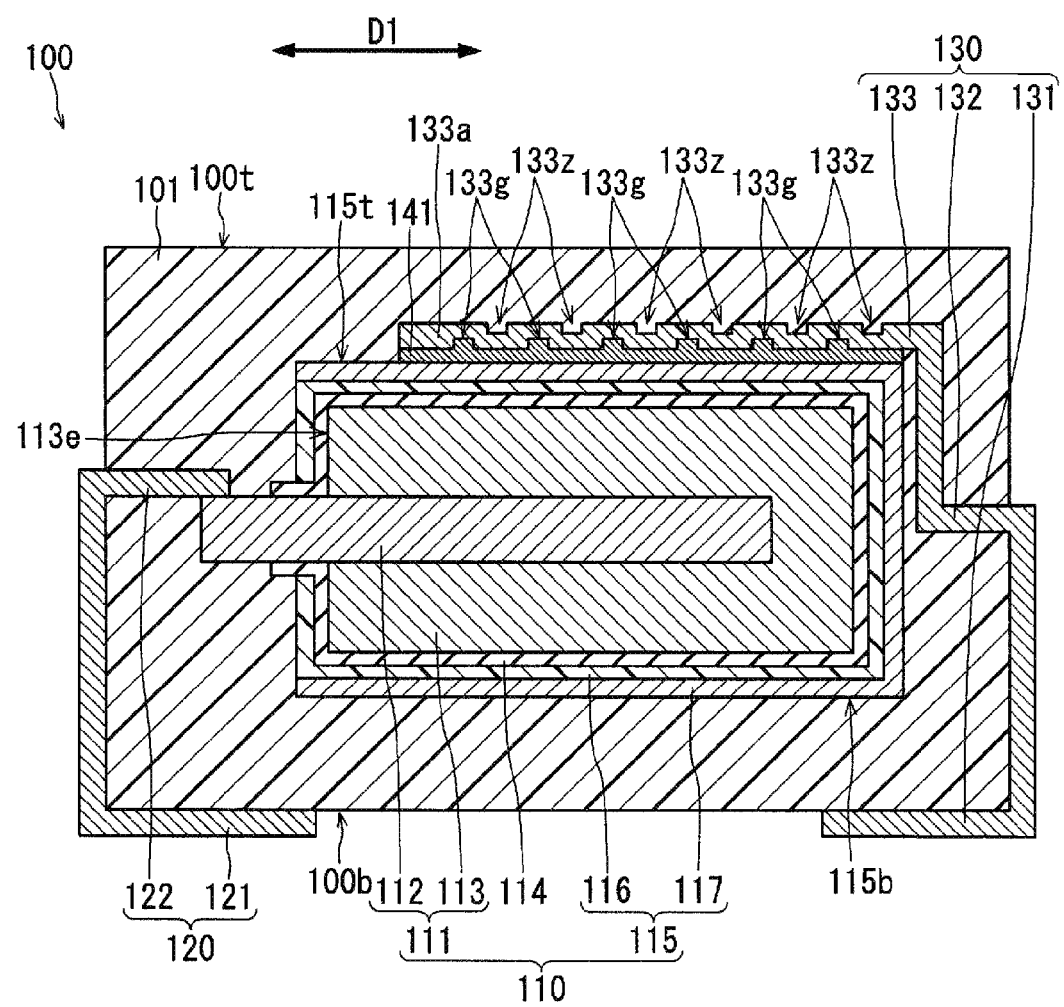
FIG. 8 is a cross-sectional view schematically showing yet another example of the first electrolytic capacitor according to the present disclosure.

Grooves 133z may also be formed in a surface, located on the opposite side of the surface located on the cathode part 115 side, of the connection part 133. FIG. 8 shows a cross-sectional view of an example of an electrolytic capacitor 100 including a cathode lead terminal 130 in which the groove 133z are formed. In the electrolytic capacitor 100 of FIG. 8, the exterior resin 101 is disposed in the grooves 133z. This can provide a high anchor effect, thus making it possible to firmly fix the connection part 133 of the cathode lead terminal 130. There is no particular limitation on the shape and arrangement of the grooves 133z. The grooves 133z may have the same shape as that of the grooves 133g described above.

In Embodiment 1, an example has been described in which the plate-shaped part 133a of the connection part 133 faces the top surface 115t of the cathode part 115 with the conductive member 141 interposed therebetween. However, the plate-shaped part 133a may be disposed so as to face the bottom surface 115b of the cathode part 115 with the conductive member 141 interposed therebetween. In that case, the first and second side walls 133sa and 133sb extend from the plate-shaped part 133a toward the top surface 100t.

An example of a method for manufacturing the electrolytic capacitor 100 will be described below. First, the capacitor element 110, the anode lead terminal 120, and the cathode lead terminal 130 are prepared. There is no particular limitation on the method for manufacturing the capacitor element 110, and the capacitor element 110 can be manufactured by a known method. The anode lead terminal 120 and the cathode lead terminal 130 can be formed by a known metalworking method.

Next, the anode wire 112 and the anode lead terminal 120 are connected to each other, and the cathode layer 117 and the cathode lead terminal 130 are connected to each other. The anode wire 112 and the anode lead terminal 120 may be connected to each other, for example, by welding a distal end portion of the anode lead terminal 120 and the wire connection part 122. The connection between the cathode layer 117 and the cathode lead terminal 130 can be achieved, for example, by the following method. First, a conductive material (e.g., a metal paste) that will form the conductive member 141 is applied to the surface of the connection part 133 (e.g., the plate-shaped part 133a) of the cathode lead terminal 130 and/or the cathode part 115 (cathode layer 117) of the capacitor element 110. Usually, the conductive material is applied to one of the plate-shaped part 133a and the cathode part 115. Next, after the connection part 133 and the cathode part 115 have been bonded via the conductive material, the conductive material is cured to form a conductive member 141. Thus, the cathode part 115 and the cathode lead terminal 130 can be connected by the conductive member 141.

Next, the capacitor element is sealed with the exterior resin 101. The sealing step can be performed by a known method. Thus, an electrolytic capacitor 100 can be manufactured. Note that the other electrolytic capacitors according to the present disclosure can also be manufactured by the same manufacturing method.

Embodiment 2

Figure 9:
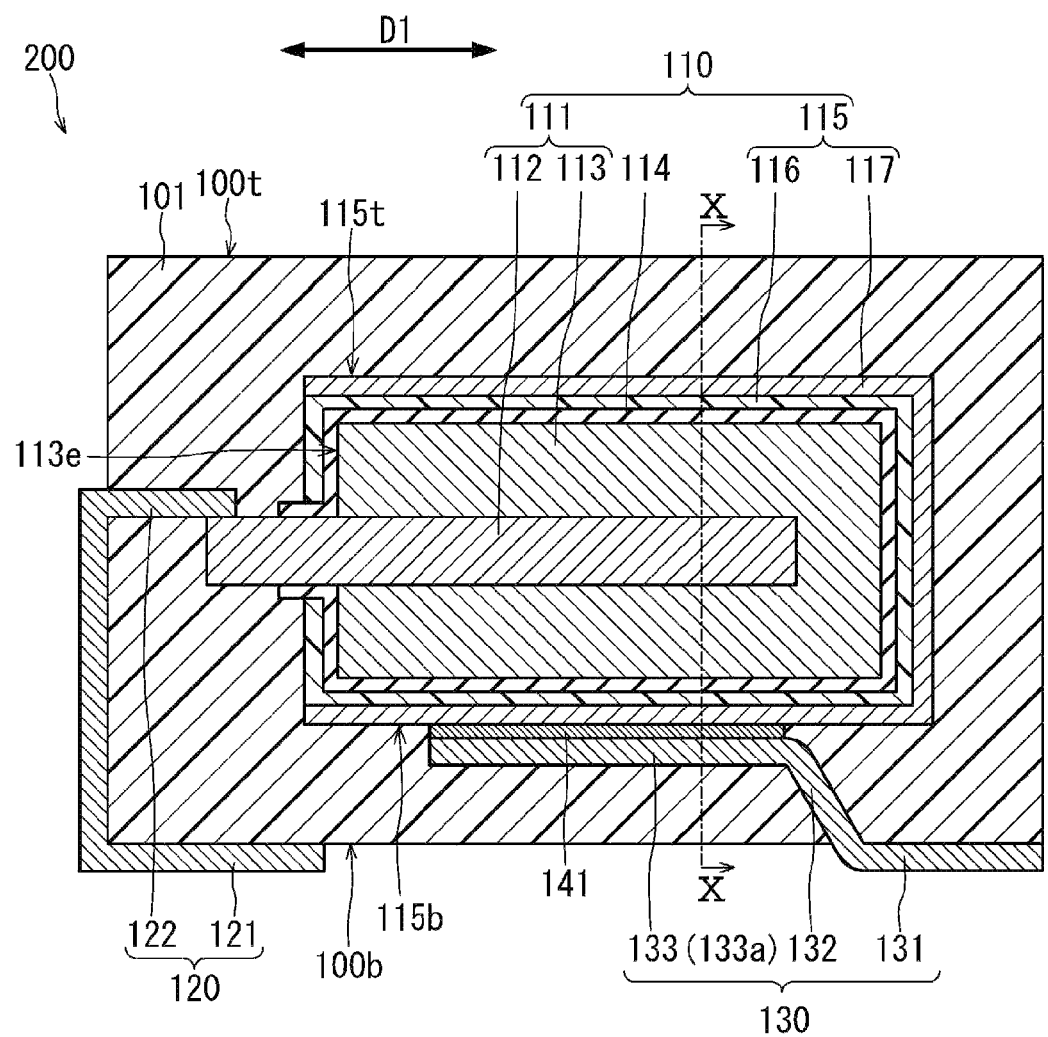
FIG. 9 is a cross-sectional view schematically showing an example of a second electrolytic capacitor according to the present disclosure.
Figure 10:
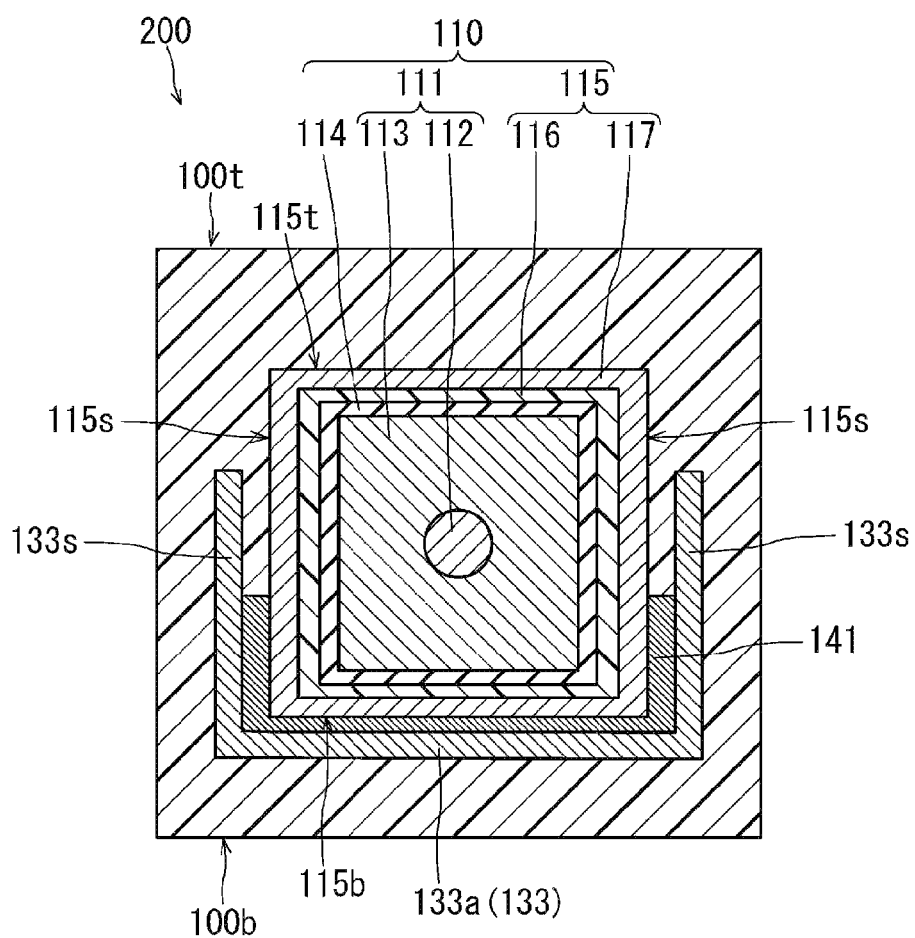
FIG. 10 is a view schematically showing a cross section taken along the line X-X in FIG. 9.
Figure 11A:
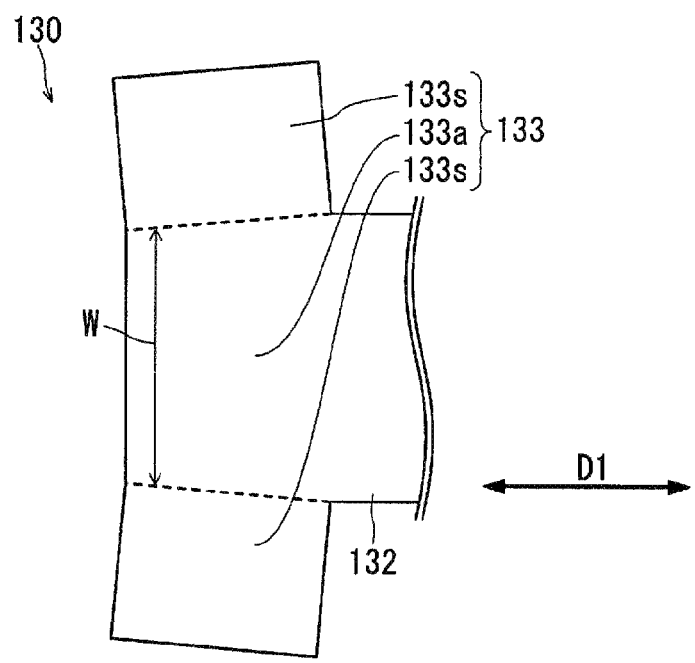
FIG. 11 is a development view schematically showing a portion of a cathode lead terminal of the electrolytic capacitor shown in FIG. 9.
FIG. 11B is a top view schematically showing a portion of the cathode lead terminal of the electrolytic capacitor shown in FIG. 9.
FIG. 11C is a side view schematically showing a portion of the cathode lead terminal of the electrolytic capacitor shown in FIG. 9.
Figure 11B:
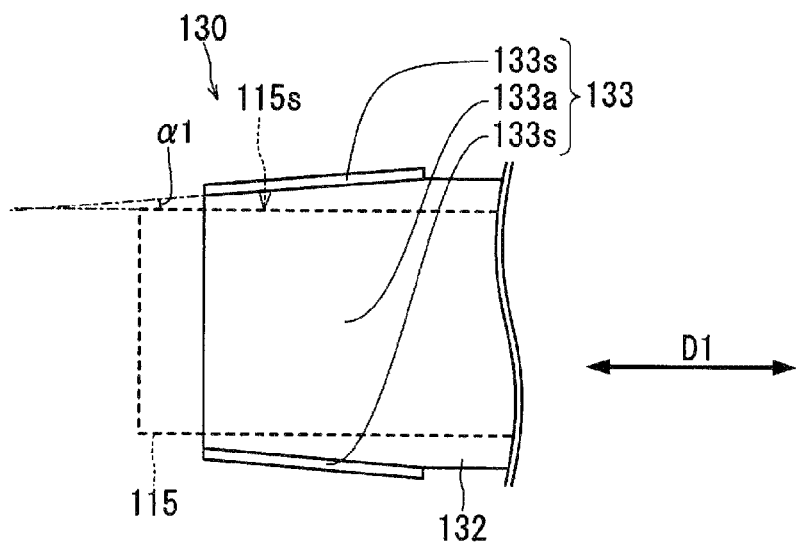
Figure 11C:
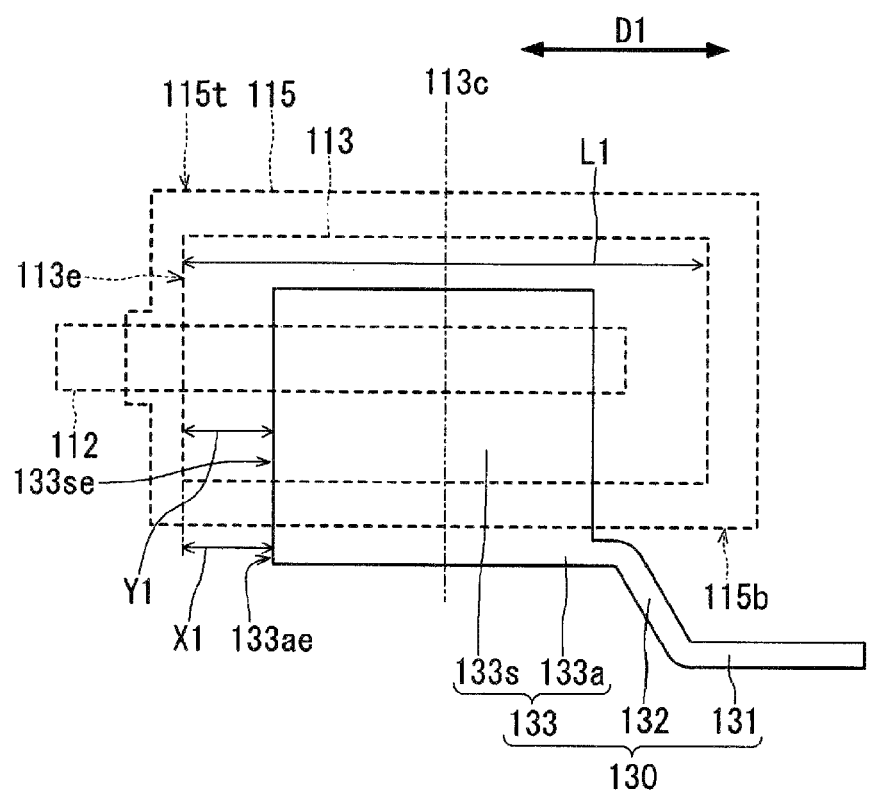

In Embodiment 2, an example of the above-described second electrolytic capacitor will be described. FIG. 9 schematically shows a cross-sectional view of an electrolytic capacitor 200 of Embodiment 2. Additionally, FIG. 10 shows a cross-sectional view taken along the line X-X in FIG. 9. FIG. 11A shows a development view of a cathode lead terminal 130 when a connection part 133 is developed flat. FIGS. 11B and 11C show a top view and a side view, respectively, of the cathode lead terminal 130. Note that FIGS. 11B and 11C also show the positions of a cathode part 115 and so forth.

The electrolytic capacitor 200 includes a capacitor element 110, an anode lead terminal 120, a cathode lead terminal 130, an exterior resin 101, and a conductive member 141. The capacitor element 110 includes an anode part 111, a dielectric layer 114, and a cathode part 115. The anode part 111 includes an anode body 113 and an anode wire 112. The anode body 113 is a rectangular parallelepiped-shaped porous sintered body, and has a dielectric layer 114 formed on a surface thereof. A portion of the anode wire 112 projects from an end face 113e of the anode body 113, and the other portions of the anode wire 112 are embedded in the anode body 113.

The cathode part 115 includes an electrolyte layer 116 disposed so as to cover the dielectric layer 114 (anode body 113), and a cathode layer 117 formed on the electrolyte layer 116. The cathode layer 117 includes, for example, a carbon layer formed on the electrolyte layer 116, and a metal particle layer formed on the carbon layer. The metal particle layer is a layer formed using a metal paste, for example.

The anode lead terminal 120 includes an anode terminal part 121 and a wire connection part 122. The anode terminal part 121 is exposed on a bottom surface 100b of the electrolytic capacitor 200. The wire connection part 122 is connected with the anode terminal part 121. The wire connection part 122 is connected to the anode wire 112. That is, the anode lead terminal 120 is electrically connected to the anode part 111 of the capacitor element 110. Note that the anode lead terminal 120 shown in FIG. 9 is merely an example, and the anode lead terminal 120 may have another shape as long as its function can be realized.

The cathode lead terminal 130 includes a cathode terminal part 131, a coupling part 132, and a connection part 133. The cathode terminal part 131 is exposed on the bottom surface 100b of the electrolytic capacitor 200. The coupling part 132 connects the cathode terminal part 131 and the connection part 133 to each other. The anode lead terminal 120 and the cathode lead terminal 130 each can be formed by working a single metal sheet by a known metalworking method.

In the following, a surface, located on the opposite side of the bottom surface 100b, of the electrolytic capacitor 200 may be referred to as a top surface 100t of the electrolytic capacitor 200. Note that the bottom surface 100b is the surface on which the anode terminal part 121 and the cathode terminal part 131 are exposed.

The cathode part 115 has two side surfaces 115s, and a bottom surface 115b and a top surface 115t that join the two side surfaces 115s. The bottom surface 115b is a surface located on the bottom surface 100b side. The top surface 115t is a surface located on the top surface 100t side. The two side surfaces 115s are substantially perpendicular to the end face 113e.

The connection part 133 includes a plate-shaped part 133a facing the bottom surface 115b with the conductive member 141 interposed therebetween, and two side walls 133s standing from the plate-shaped part 133a. The two side walls 133s respectively face the two side surfaces 115s of the cathode part 115 with the conductive member 141 interposed therebetween. The two side walls 133s stand substantially perpendicularly from the plate-shaped part 133a.

The conductive member 141 is disposed between the bottom surface 115b and the plate-shaped part 133a, and between the two side surfaces 115s and the two side walls 133s facing the respective corresponding side surfaces. That is, the conductive member 141 is in contact with and electrically connects the bottom surface 115b and the plate-shaped part 133a. Furthermore, the conductive member 141 is in contact with and electrically connects the two side surfaces 115s and the two side walls 133s.

FIG. 11A shows a width W of the plate-shaped part 133a. The width W is a length of the plate-shaped part 133a in a direction perpendicular to the direction D1. The width W of the plate-shaped part 133a increases in a direction away from the end face 113e of the anode body 113. The plate-shaped part 133a shown in FIG. 11A has an isosceles trapezoid shape. Also, the two side walls 133s stand from two leg portions of the isosceles trapezoid. The side walls 133s shown in FIG. 11A have a rectangular shape.

FIG. 11B shows an angle α1 formed by a direction in which each side wall 133s extends and the corresponding side surface 115s (more specifically, a plane including the side surface 115s) of the cathode part 115. FIG. 11C shows a distance X1, in a direction D1 in which the anode wire 112 extends, between the end face 113e and an end portion (edge side) 133ae of the plate-shaped part 133a located on the end face 113e side, and a distance Y1, in the direction D1, between the end face 113e and an end portion 133se (edge side) of the side wall 133s located on the end face 113e side. Additionally, FIG. 11C also shows a length L1 of the anode body 113 in the direction D1. Additionally, FIG. 11C also shows a center 113c of the anode body 113 in the direction D1.

The distance X1, the distance Y1, and the length L1 may be in the above-described ranges. Each of the end portion 133ae of the plate-shaped part 133a, and the end portions 133se of the side walls 133s is at a position closer to the end face 113e than to the center 113c of the anode body 113.

In the electrolytic capacitor 200, the volume between the cathode part 115 and the two side walls 133s of the connection part 133 increases in a direction away from the end face 113e of the anode body 113. In another aspect, the area between the cathode part 115 and the side walls 133s in a cross section perpendicular to the direction D1 increases in a direction away from the end face 113e of the anode body 113. With these configurations, when bonding the cathode part 115 and the connection part 133 using the material (conductive material) of the conductive member 141, the conductive material can be easily guided in a direction away from the end face 113e. Accordingly, it is possible to achieve the above-described effects.

Embodiment 3

In Embodiment 3, another example of the second electrolytic capacitor will be described. An electrolytic capacitor 200a of Embodiment 3 practically differs from the electrolytic capacitor 200 of Embodiment 2 only with regard to the shape of the connection part 133, and therefore redundant descriptions have been omitted.

Figure 12:
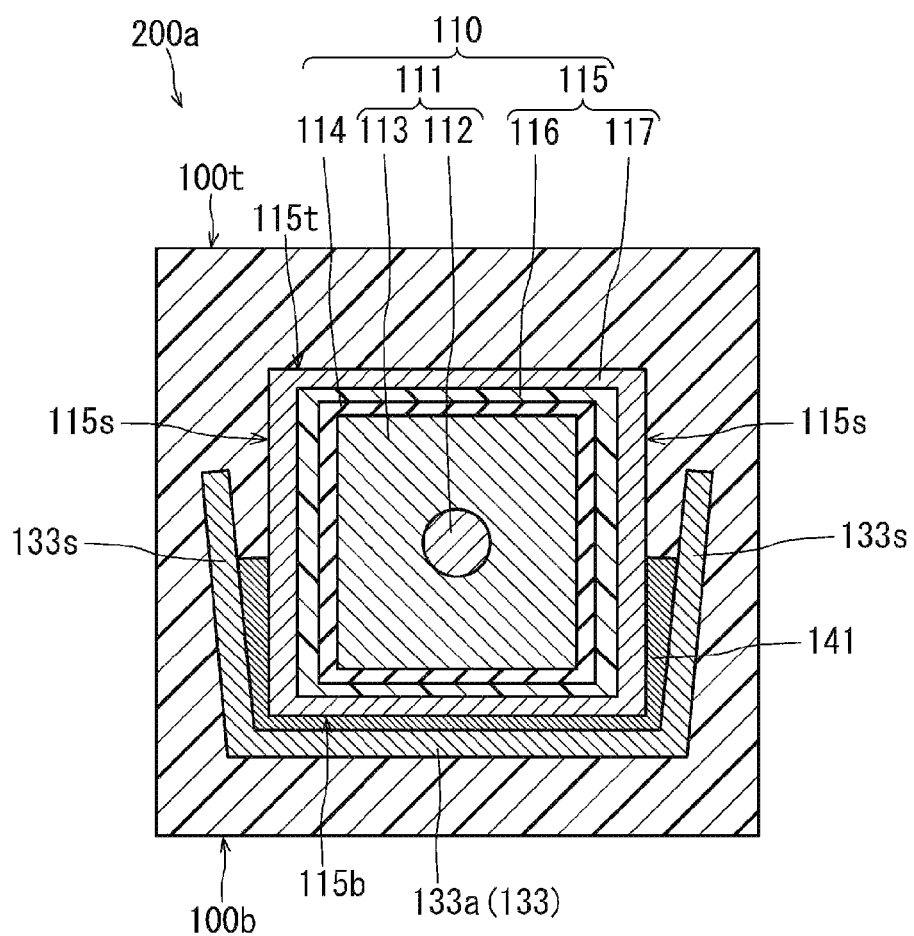
FIG. 12 is a cross-sectional view schematically showing another example of the second electrolytic capacitor according to the present disclosure.
Figure 13A:
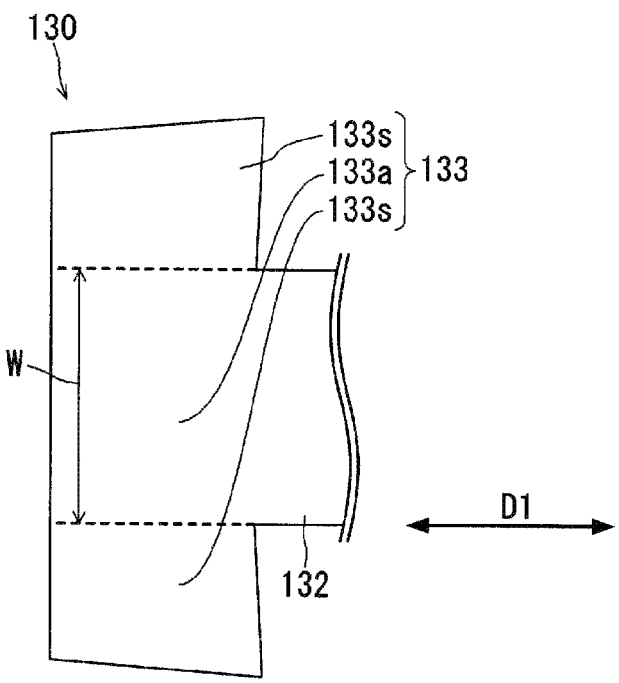
FIG. 13A is a development view schematically showing a portion of a cathode lead terminal of the electrolytic capacitor shown in FIG. 12.
Figure 13B:
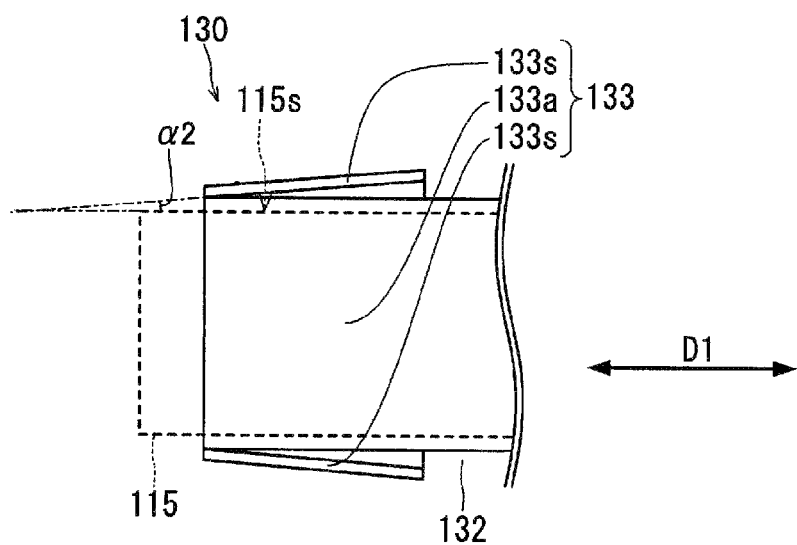
FIG. 13B is a top view schematically showing a portion of the cathode lead terminal of the electrolytic capacitor shown in FIG. 12.

The cross-sectional view of the electrolytic capacitor 200a of Embodiment 3 taken along the direction D1 is the same as the cross-sectional view of the electrolytic capacitor 200 shown in FIG. 9, and therefore the illustration thereof has been omitted. FIG. 12 shows a cross-sectional view of the electrolytic capacitor 200a at a position corresponding to the line X-X in FIG. 9. FIG. 13A shows a development view of a cathode lead terminal 130 of Embodiment 3 when a connection part 133 is developed flat. FIG. 13B shows a top view of the cathode lead terminal 130. FIG. 13B also shows the position of a cathode part 115. FIG. 13B also shows an angle α2 formed by a direction in which an upper side of each side wall 133s of the connection part 133 extends, and the corresponding side surface 115s (more specifically, a plane including the side surface 115s) of the cathode part 115. Note that the side view of the cathode lead terminal 130 of Embodiment 3 is the same as that shown in FIG. 11C, and therefore the illustration thereof has been omitted.

In Embodiment 3, the plate-shaped part 133a of the connection part 133 has a rectangular shape. The distance between each of the two side walls 133s of the connection part 133 and the cathode part 115 increases as the distance from the end face 113e of the anode body 113 increases, and also increases as the distance from the plate-shaped part 133a increases.

In the electrolytic capacitor 200a of Embodiment 3 as well, the volume between the cathode part 115 and the two side walls 133s of the connection part increases in a direction away from the end face 113e of the anode body 113. With this configuration, it is possible to achieve the above-described effects.

Embodiment 4

In Embodiment 4, an example of the third electrolytic capacitor will be described. An electrolytic capacitor 300 of Embodiment 4 practically differs from the electrolytic capacitor 200 of Embodiment 2 only with regard to the shape of the connection part 133, and therefore redundant descriptions have been omitted.

Figure 14:
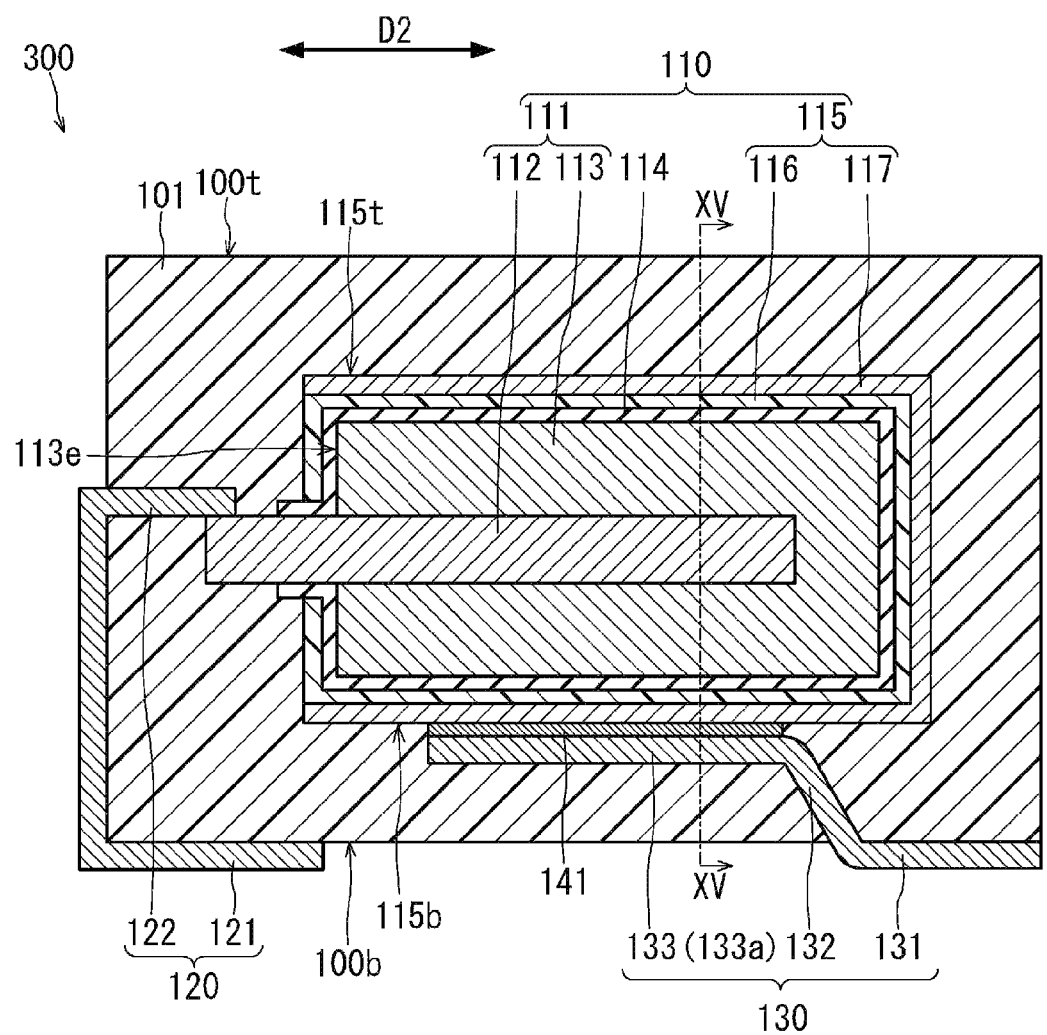
FIG. 14 is a cross-sectional view schematically showing an example of a third electrolytic capacitor according to the present disclosure.
Figure 15:
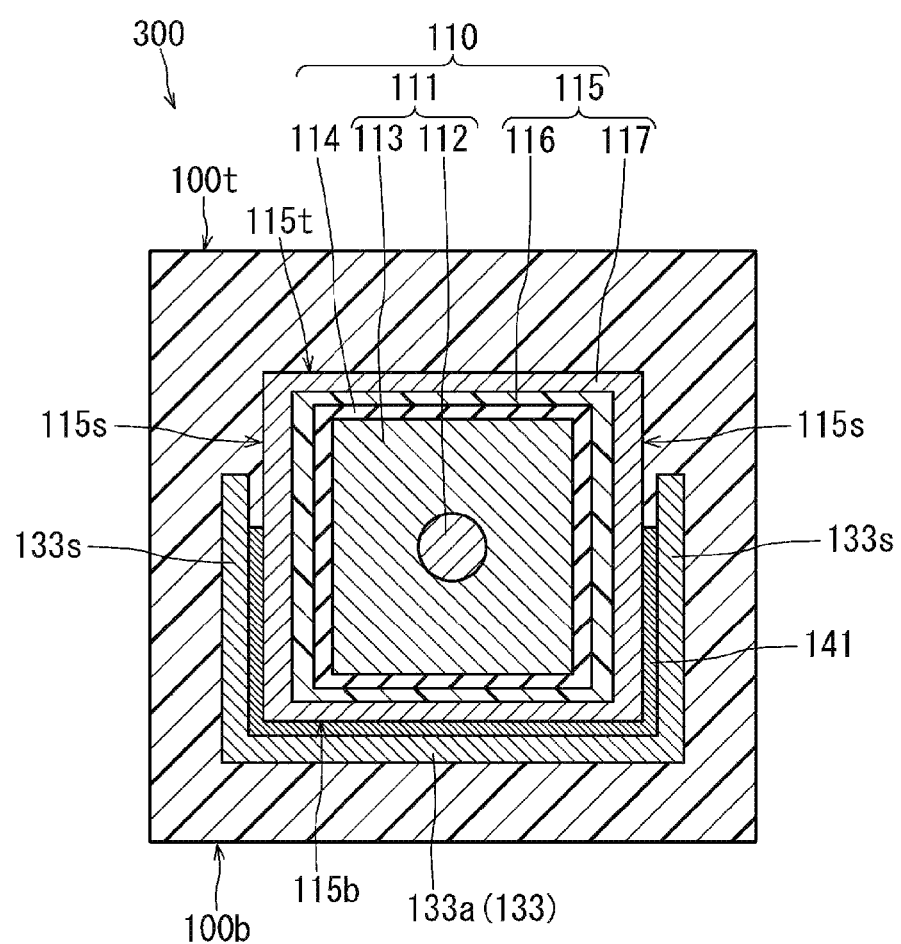
FIG. 15 is a view schematically showing a cross section taken along the line XV-XV in FIG. 14.
Figure 16A:
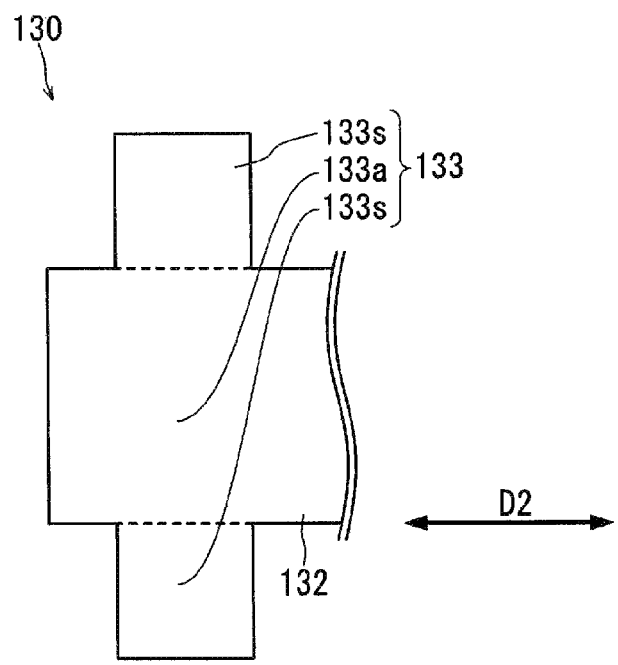
FIG. 16A is a development view schematically showing a portion of a cathode lead terminal of the electrolytic capacitor shown in FIG. 14.
Figure 16B:
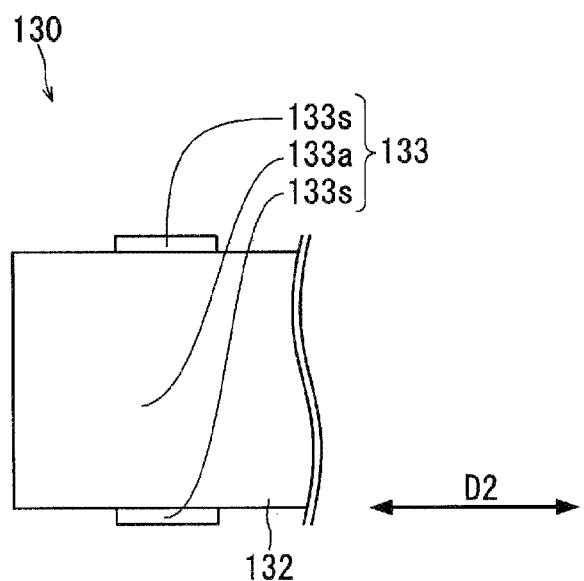
FIG. 16B is a top view schematically showing a portion of the cathode lead terminal of the electrolytic capacitor shown in FIG. 14.
Figure 16C:
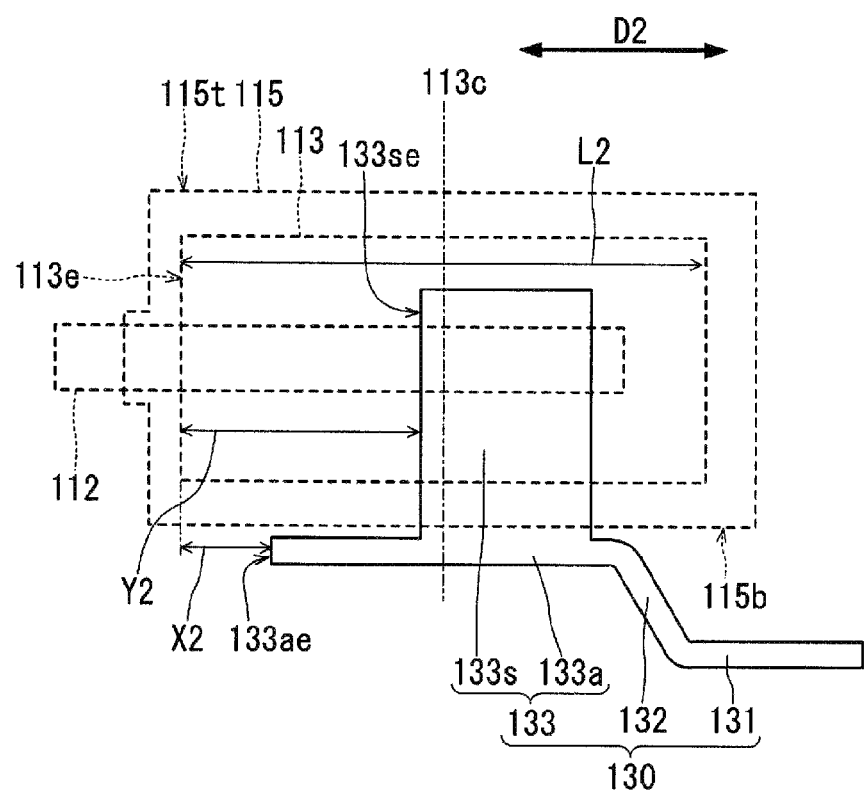
FIG. 16C is a side view schematically showing a portion of the cathode lead terminal of the electrolytic capacitor shown in FIG. 14.

FIG. 14 shows a cross-sectional view of the electrolytic capacitor 300. Note that FIG. 14 is substantially the same as FIG. 9. FIG. 15 shows a cross-sectional view taken along the line XV-XV in FIG. 14. FIG. 16A shows a development view of a connection part 133 of the electrolytic capacitor 300 that is developed flat. FIGS. 16B and 16C show a top view and a side view, respectively, of the connection part 133.

The cathode lead terminal 130 of the electrolytic capacitor 300 includes a connection part 133 that is connected to the cathode part 115 via the conductive member 141. The connection part 133 includes a plate-shaped part 133a facing the bottom surface 115b of the cathode part 115 with the conductive member 141 interposed therebetween, and two side walls 133s standing substantially perpendicularly from the plate-shaped part 133a. The two side walls 133s respectively face the two side surfaces 115s of the cathode part 115.

The conductive member 141 is disposed between the bottom surface 115b and the plate-shaped part 133a, and between each of the two side surface 115s and the corresponding one of the two side walls 133s. That is, the conductive member 141 is in contact with and electrically connects the bottom surface 115b and the plate-shaped part 133a, and is in contact with and electrically connects each of the two side surfaces 115s and the corresponding one of the two side walls 133s.

FIG. 16C shows a distance X2, in a direction D2 in which the anode wire extends, between the end face 113e and an end portion (edge side) 133ae of the plate-shaped part 133a located on the end face 113e side. Additionally, FIG. 16C shows a distance Y2, in the direction D2, between the end face 113e and an end portion (edge side) 133se of each of the two side walls 133s located on the end face 113e side. Additionally, FIG. 16C shows a length L2 of the anode body 113 in the direction D2. Additionally, FIG. 16C shows a center 113c of the anode body 113 in the direction D2.

The relationship between the distance X2, the distance Y2, and the length L2 may be in the above-described ranges. As shown in FIG. 16C, the end portion 133se of each of the two side walls 133s of the connection part 133 located on the end face 113e side is more distant from the end face 113e than the end portion 133ae of the plate-shaped part 133a located on the end face 113e side is from the end face 113e. That is, the distance Y2 is greater than the distance X2.

To increase the area of the conductive member 141, it is necessary to apply a large amount of the conductive material serving as the material of the conductive member 141. However, in that case, a portion of the conductive material may protrude from the connection part 133. With the above-described configuration, the conductive material is likely to protrude from the end portion 133se. Since the end portion 133se is present at a position distant from the anode wire 112, it is possible to prevent the conductive material from reaching the anode wire 112 even if the conductive material protrudes from the connection part 133. To enhance this effect, the conductive material may be disposed at a position distant from the end face 113e. For example, the conductive material may be disposed at a position more distant from the end face 113e than the center 113c is from the end face 113e. Alternatively, the conductive material may be disposed at a position more distant from the end face 113e than the end portion 133se is from the end face 113e.

Each of the end portion 133ae and the end portion 133se is present on the end face 113e side relative to the center 113c. This configuration makes it possible to increase the area connected by the conductive member 141. In this case as well, it is possible to prevent the conductive material for forming the conductive member 141 from reaching the anode wire 112 as described above.

In Embodiments 2 to 4, examples have been described in which the plate-shaped part 133a of the connection part 133 faces the bottom surface 115b of the cathode part 115 with the conductive member 141 interposed therebetween. However, the plate-shaped part 133a may be disposed so as to face the top surface 115t of the cathode part 115 with the conductive member 141 interposed therebetween. In that case, the two side walls 133s extend from the plate-shaped part 133a toward the bottom surface 100b.

In the electrolytic capacitor 200 of Embodiment 2 or 3, the grooves described in Embodiment 1 may be formed in the connection part 133. In that case, as described in Embodiment 4, the end portion of each of the two side walls 133s of the connection part 133 located on the end face 113e side may be more distant from the end face 113e than the end portion of the plate-shaped part 133a located on the end face 113e side is from the end face 113e.

In the electrolytic capacitor of Embodiment 1 or 2, as described in Embodiment 4, the end portion of each of the two side walls 133s of the connection part 133 located on the end face 113e side may be more distant from the end face 113e than the end portion of the plate-shaped part 133a located on the end face 113e side is from the end face 113e.

INDUSTRIAL APPLICABILITY

The present disclosure is applicable to electrolytic capacitors.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST 100, 200, 200a, 300 . . . Electrolytic capacitor
101 . . . Exterior resin
110 . . . Capacitor element
112 . . . Anode wire
113 . . . Anode body
113e . . . . End face
114 . . . Dielectric layer
115 . . . Cathode part
115b . . . Bottom surface
115sa . . . First side surface
115sb . . . Second side surface
115t . . . Top surface
120 . . . Anode lead terminal
130 . . . Cathode lead terminal
133, 213, 333 . . . Connection part
133a, 133a, 133a . . . plate-shaped part
133g, 133z . . . . Groove
133ga . . . First groove
133gb . . . Second groove
133s . . . . Side wall
133sa . . . First side wall
133sb . . . Second side wall
132z . . . Groove
141 . . . Conductive member

The invention claimed is:

1. An electrolytic capacitor comprising:
a capacitor element;
an anode lead terminal and a cathode lead terminal that are electrically connected to the capacitor element;
a conductive member; and
an exterior resin disposed around the capacitor element,
wherein the capacitor element includes an anode body that is a porous sintered body having a dielectric layer formed on a surface thereof, an anode wire projecting from an end face of the anode body, and a cathode part disposed adjacent to the dielectric layer,
the cathode part has first and second side surfaces, and a bottom surface and a top surface that join the first and second side surfaces,
the cathode lead terminal includes a connection part that is connected to the cathode part via the conductive member,
the connection part includes a plate-shaped part facing one surface selected from the bottom surface and the top surface with the conductive member interposed between the plate-shaped part and the one surface, and first and second side walls standing from the plate-shaped part and respectively facing the first and second side surfaces, a plurality of grooves are formed in a surface, located on the cathode part side, of each of the plate-shaped part and the first and second side walls, the plurality of grooves include a plurality of first grooves formed so as to extend continuously from the plate-shaped part across the first side wall, and a plurality of second grooves formed so as to extend continuously from the plate-shaped part across the second side wall, the conductive member is disposed between the one surface and the plate-shaped part, between the first side surface and the first side wall, and between the second side surface and the second side wall, and of the plurality of grooves, grooves that are formed in the first and second side walls are each formed so as to be away from the end face in a direction away from the plate-shaped part.

2. The electrolytic capacitor according to claim 1, wherein the conductive member is disposed in the first grooves so as to extend continuously from the plate-shaped part across the first side wall, and the conductive member is disposed in the second grooves so as to extend continuously from the plate-shaped part across the second side wall.

3. The electrolytic capacitor according to claim 1, wherein each of the plurality of first grooves extends continuously with the corresponding one of the plurality of second grooves to form a single groove, and the plurality of grooves extend continuously from the plate-shaped part across the first and second side walls.

4. The electrolytic capacitor according to claim 1, wherein each of the plurality of grooves extends in a direction substantially perpendicular to a direction in which the anode wire extends.

5. The electrolytic capacitor according to claim 1, wherein grooves are also formed in a surface, located on an opposite side of the surface located on the cathode part side, of each of the plate-shaped part and the first and second side walls, and the exterior resin is disposed in the grooves of the surface located on the opposite side.

6. The electrolytic capacitor according to claim 1, wherein a volume between the cathode part and the first side wall, and a volume between the cathode part and the second side wall each increase in a direction away from the end face.

7. The electrolytic capacitor according to claim 1, wherein an end portion of the first side wall located on the end face side, and an end portion of the second side wall located on the end face side are each more distant from the end face than an end portion of the plate-shaped part located on the end face side is from the end face.

8. An electrolytic capacitor comprising:

a capacitor element;

an anode lead terminal and a cathode lead terminal that are electrically connected to the capacitor element;

a conductive member; and an exterior resin disposed around the capacitor element, wherein the capacitor element includes an anode body that is a porous sintered body having a dielectric layer formed on a surface thereof, an anode wire projecting from an end face of the anode body, and a cathode part disposed adjacent to the dielectric layer, the cathode part has first and second side surfaces, and a bottom surface and a top surface that join the first and second side surfaces, the cathode lead terminal includes a connection part that is connected to the cathode part via the conductive member, the connection part includes a plate-shaped part facing one surface selected from the bottom surface and the top surface with the conductive member interposed between the plate-shaped part and the one surface, and first and second side walls standing from the plate-shaped part and respectively facing the first and second side surfaces, a plurality of grooves are formed in a surface, located on the cathode part side, of each of the plate-shaped part and the first and second side walls, the plurality of grooves include a plurality of first grooves formed so as to extend continuously from the plate-shaped part across the first side wall, and a plurality of second grooves formed so as to extend continuously from the plate-shaped part across the second side wall, the conductive member is disposed between the one surface and the plate-shaped part, between the first side surface and the first side wall, and between the second side surface and the second side wall, and a volume between the cathode part and the first side wall, and a volume between the cathode part and the second side wall each increase in a direction away from the end face.

* * * * *